(12) United States Patent
Tanaka et al.

(10) Patent No.: US 10,878,772 B2
(45) Date of Patent: Dec. 29, 2020

(54) APPARATUS AND METHOD FOR TESTING FOR ABNORMAL CONTROL BY A DISPLAY CONTROL APPARATUS

(71) Applicant: MITSUBISHI ELECTRIC CORPORATION, Tokyo (JP)

(72) Inventors: Kohei Tanaka, Tokyo (JP); Haruhiko Wakayanagi, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/323,866

(22) PCT Filed: Sep. 16, 2016

(86) PCT No.: PCT/JP2016/077546
§ 371 (c)(1),
(2) Date: Feb. 7, 2019

(87) PCT Pub. No.: WO2018/051506
PCT Pub. Date: Mar. 22, 2018

(65) Prior Publication Data
US 2019/0197985 A1 Jun. 27, 2019

(51) Int. Cl.
*G09G 5/00* (2006.01)
*G09G 3/00* (2006.01)
(Continued)

(52) U.S. Cl.
CPC ............ *G09G 5/003* (2013.01); *B60K 35/00* (2013.01); *B60K 37/06* (2013.01);
(Continued)

(58) Field of Classification Search
CPC .......... G09G 5/003; G09G 5/00; G09G 5/026; G09G 3/006; G09G 3/20;
(Continued)

(56) References Cited

U.S. PATENT DOCUMENTS

2012/0036418 A1 2/2012 Morino et al.
2014/0226025 A1* 8/2014 Han ................. G09G 5/003
348/177

(Continued)

FOREIGN PATENT DOCUMENTS

| JP | 2008-212274 A | 9/2008 |
|----|---------------|--------|
| JP | 2011-57015 A | 3/2011 |
| JP | 2012-35677 A | 2/2012 |

OTHER PUBLICATIONS

International Search Report for PCT/JP2016/077546 dated Dec. 6, 2016.

(Continued)

*Primary Examiner* — Stephen G Sherman
(74) *Attorney, Agent, or Firm* — Birch, Stewart, Kolasch & Birch, LLP

(57) ABSTRACT

Provided is a technique for preventing excessive determination that control in a display control apparatus is abnormal. A control test apparatus includes an acquisition unit and a controller. The controller determines, whenever necessary, on the basis of a second image that is output from the display control apparatus and first test data that is acquired in the acquisition unit, whether the control in the display control apparatus over the display apparatus is abnormal. The controller stops the determination until a predetermined time elapses from a first time point, the predetermined time being equal to or greater than a time from the first time point at which the first test data is input to the controller to a second time point at which the second image is input to the controller.

8 Claims, 20 Drawing Sheets

(51) Int. Cl.
  *B60K 35/00*   (2006.01)
  *B60K 37/06*   (2006.01)
  *G09G 3/20*    (2006.01)
  *G09G 5/02*    (2006.01)
  *H04N 17/04*   (2006.01)
  *G06F 11/10*   (2006.01)

(52) U.S. Cl.
  CPC ......... *G06F 11/1004* (2013.01); *G09G 3/006* (2013.01); *G09G 3/20* (2013.01); *G09G 5/00* (2013.01); *G09G 5/026* (2013.01); *H04N 17/04* (2013.01); *G09G 2320/0693* (2013.01); *G09G 2330/12* (2013.01); *G09G 2340/14* (2013.01); *G09G 2360/16* (2013.01)

(58) Field of Classification Search
  CPC ....... G09G 2320/0693; G09G 2330/12; G09G 2340/14; G09G 2360/16; B60K 35/00; B60K 37/06; G06F 11/1004; H04N 17/04
  See application file for complete search history.

(56) References Cited

U.S. PATENT DOCUMENTS

| | | | |
|---|---|---|---|
| 2016/0247429 A1* | 8/2016 | Li | G01J 5/0066 |
| 2017/0011677 A1* | 1/2017 | Lin | G09G 3/344 |
| 2019/0059145 A1* | 2/2019 | Miyoshi | G02F 1/1309 |

* cited by examiner

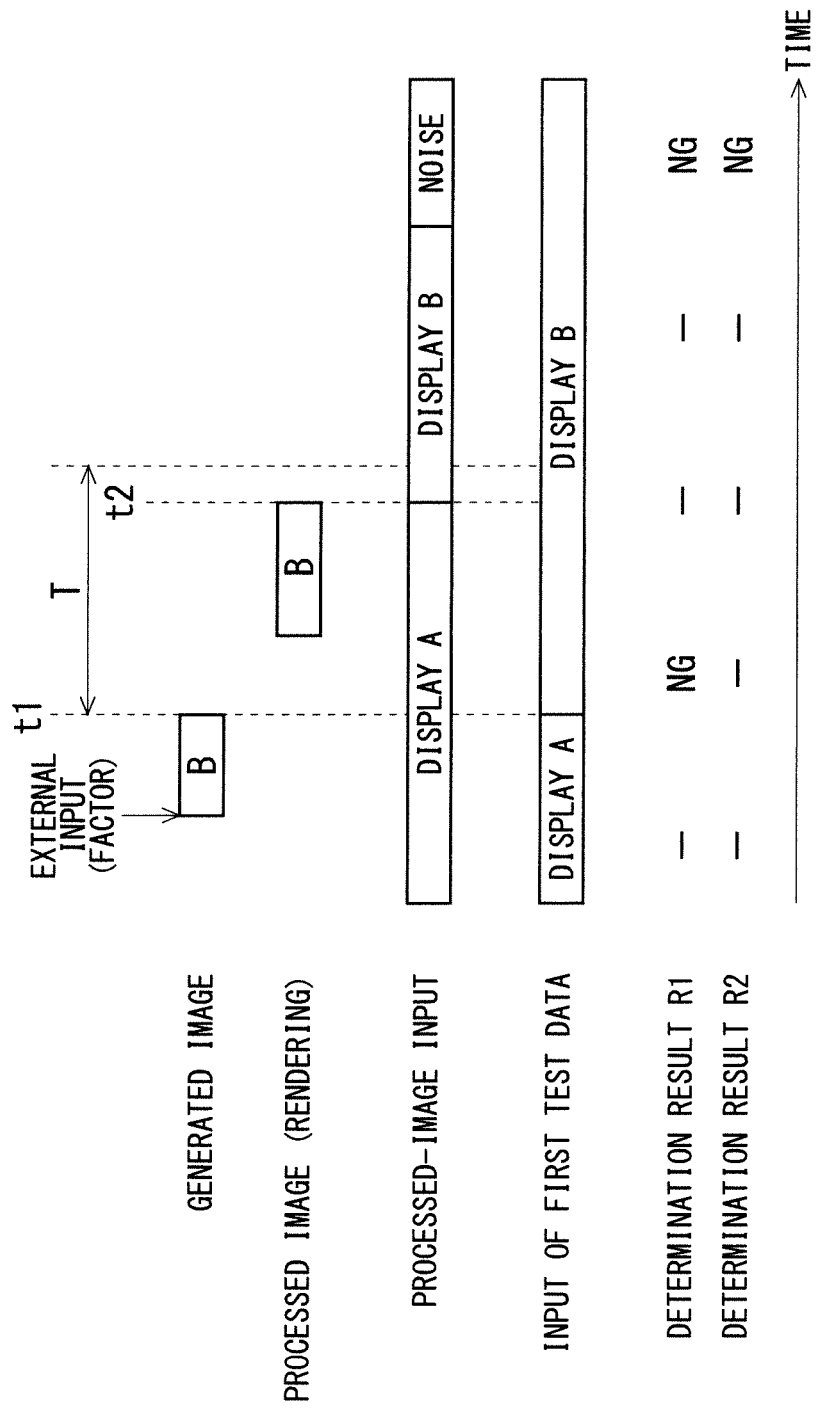

F I G . 2 3
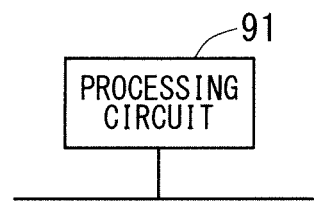
F I G . 2 4
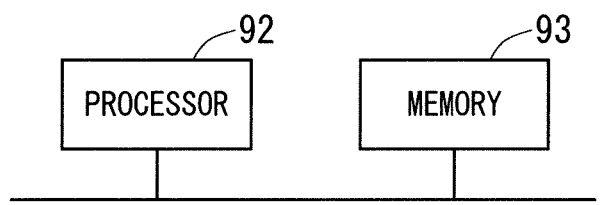

APPARATUS AND METHOD FOR TESTING FOR ABNORMAL CONTROL BY A DISPLAY CONTROL APPARATUS

TECHNICAL FIELD

The present invention relates to a control test apparatus that tests for abnormality of control in a display control apparatus over a display apparatus, and to a control test method in the control test apparatus.

BACKGROUND ART

Test apparatuses are proposed that compare generated images with desired images to be acquired from the generated images having normally undergone pre-processing for display in display apparatuses. Such a test apparatus enables checking whether an image that is displayed in the display apparatus is normal.

To correctly perform this checking, another image identical to the image that is input to the display apparatus and test data, such as check data, that is used for the comparison, need to be input to an inspection module at almost the same timing. Proposed are various techniques for detailed timing-control in order to achieve such simultaneous input. For instance, Patent Document 1 proposes temporally storing, in a buffer, test data generated from an image to be displayed, and inputting the test data and an image that is read to an inspection module at the timing of reading the image to be displayed from a memory.

PRIOR ART DOCUMENT

Patent Document

Patent Document 1: Japanese Patent Application Laid-Open No. 2012-035677

SUMMARY

Problem to be Solved by the Invention

The technique in Patent Document 1 is configured to check that the image generated by the display control apparatus is correct when the display control apparatus practically operates. Unfortunately, the technique is not configured to conduct such a check during the development of the display control apparatus, thus resulting in failure to conduct a relatively complex test. In addition, such a check requires a plurality of apparatuses, such as cameras capturing images, and also requires setting adjustments between the apparatuses, such as calibrations of time, position, and color. Furthermore, the timing of image input to the inspection module is difficult to coincide with the timing of test data input to the inspection module. As a result, the control in the display control apparatus is excessively determined to be abnormal.

To solve this problem, it is an object of the present invention to provide a technique for preventing excessive determination that control in a display control apparatus is abnormal.

Means to Solve the Problem

A control test apparatus according to the present invention tests for abnormality of control in a display control apparatus over a display apparatus, the display control apparatus controlling display in the display apparatus. The display control apparatus is configured to acquire a first image, and to output, to the display apparatus and the control test apparatus, a second image being the first image that has undergone pre-processing for display in the display apparatus. The control test apparatus includes the following: an acquisition unit configured to acquire, in accordance with a change in the first image, first test data for checking that a third image is input to the display apparatus, the third image being to be acquired from the first image having normally undergone the pre-processing; and a controller configured to receive the second image as output from the display control apparatus and the first test data as acquired in the acquisition unit, and to determine, whenever necessary, on the basis of the second image and the first test data, whether the control in the display control apparatus over the display apparatus is abnormal. The controller is configured to stop the determination until a predetermined time elapses from a first time point, the predetermined time being equal to or greater than a time from the first time point at which the first test data is input to the controller to a second time point at which the second image is input to the controller.

Effects of the Invention

According to the present invention, the determination whether the control in the display control apparatus over the display apparatus is abnormal is stopped until the predetermined time elapses from the first time point, the predetermined time being equal to or greater than the time from the first time point, at which the first test data is input to the controller, to the second time point, at which the second image is input to the controller. This prevents the excessive determination that the control in the display control apparatus is abnormal.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a timing chart showing the operation of the control test apparatus according to the first embodiment.

FIG. 23 is a block diagram illustrating the configuration of hardware in a control test apparatus according to another modification.

FIG. 24 is a block diagram illustrating the configuration of hardware in a control test apparatus according to still another modification.

DESCRIPTION OF EMBODIMENT(S)

First Embodiment

Figure 1:
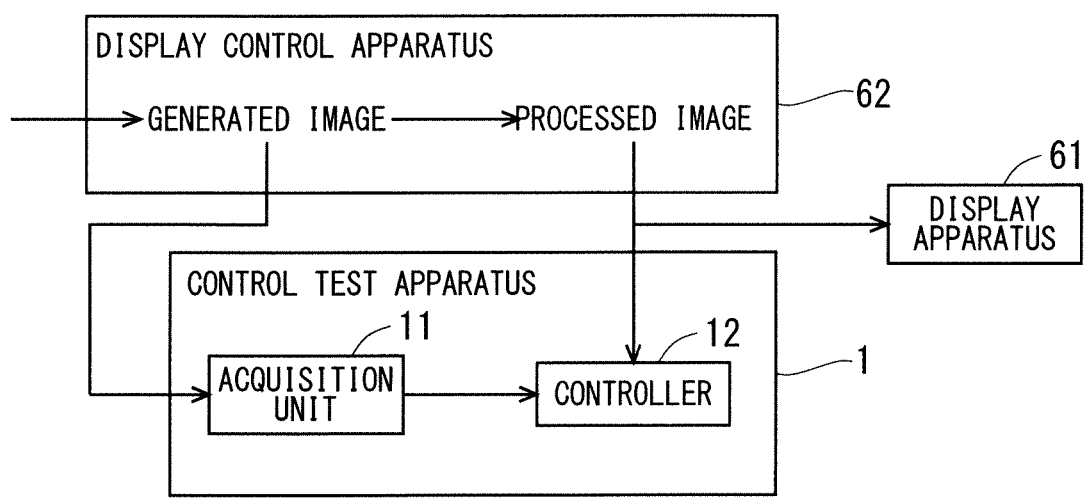
FIG. 1 is a block diagram illustrating the configuration of a control test apparatus according to a first embodiment.

FIG. 1 is a block diagram illustrating the configuration of a control test apparatus according to a first embodiment of the present invention. A control test apparatus 1 in FIG. 1 is connected to a display control apparatus 62 that controls display in a display apparatus 61. The control test apparatus 1 tests for abnormality of the control in the display control apparatus 62 over the display apparatus 61. The control test apparatus 1 and the display control apparatus 62, when being software, may be separate components. Alternatively, the control test apparatus 1 and the display control apparatus 62, when being hardware, may be separate components. An example of the display apparatus 61 is a liquid crystal display used as a display apparatus that displays a vehicle's instrument panel, as an industrial display apparatus, or as other apparatuses.

The following details the display control apparatus 62 prior to the control test apparatus 1.

The display control apparatus 62 acquires a first image on the basis of an external input. For instance, the display control apparatus 62 may acquire the first image by generating the first image on the basis of the external input. Alternatively, the display control apparatus 62 may acquire the first image by selecting a first image from among a plurality of prepared first images on the basis of the external input. The following mainly describes that the display control apparatus 62 generates the first image. Hereinafter, the first image can be referred to as a "generated image".

This generated image undergoes, in the display control apparatus 62, pre-processing for display in the display apparatus 61. Examples of the pre-processing for display in the display apparatus 61 include double buffering and triple buffering for synchronization with the display in the display apparatus 61, and image superimposition.

Hereinafter, a second image can be referred to as a "processed image". The second image is the generated image that has undergone the pre-processing for display in the display apparatus 61. Hereinafter, a third image can be referred to as a "desired image". The third image is acquired from the generated image having normally undergone the pre-processing. If the pre-processing has been normally performed, the processed image is identical to the desired image; otherwise, the processed image is different from the desired image.

The display control apparatus 62 outputs the processed image to the display apparatus 61 and the control test apparatus 1. The processed image as output to the display apparatus 61 is displayed by the display apparatus 61.

Next, the following details the control test apparatus 1. The control test apparatus 1 in FIG. 1 includes an acquisition unit 11 and a controller 12.

The acquisition unit 11 acquires first test data in accordance with a change in the generated image in the display control apparatus 62. The first test data is used to check that the desired image is input to the display apparatus 61. The first test data contains, for instance, an inspection value, such as a cyclic redundancy code (CRC).

For instance, the acquisition unit 11 may acquire the test data by generating the test data on the basis of the detail of the change in the generated image. Alternatively, the acquisition unit 11 may acquire the test data by selecting a test data piece from among a plurality of prepared test data pieces on the basis of the detail of the change. The following mainly describes that the acquisition unit 11 acquires the test data by selection, that is, the acquisition unit 11 extracts the test data.

The controller 12 comprehensively controls the components of the control test apparatus 1. The controller 12 receives the processed image as output from the display control apparatus 62, and the first test data as extracted in the acquisition unit 11. The controller 12 determines, whenever necessary, on the basis of the processed image and the first test data, whether the control in the display control apparatus 62 over the display apparatus 61 is abnormal, that is, whether display control is abnormal.

Here, as illustrated in FIG. 2, the first test data for a display B is input to the controller 12 at almost the same timing as the generation of a generated image B. In contrast to this, since the pre-processing for display in the display apparatus 61 takes some time, the processed image is input to the controller 12 at the timing t2 after the timing t1 at which the generated image is generated and the timing t1 at which the first test data is input to the controller 12, as indicated by the display B in FIG. 2.

Hence, in determination upon reception of the first test data, the controller 12 performs the determination using first test data that is not consistent with the processed image. In this case, the controller 12 can determine that the display control is abnormal in determination upon reception of the first test data, as indicated by an item, "Determination Result R1" in FIG. 2. Reference is made to an indication, "-,NG,-,-, NG" in Determination Result R1. The indication, "NG" represents a determination that the display control is abnormal. Moreover, the indication, "-" represents no determination that the display control is abnormal.

In contrast to this, the controller 12 according to the first embodiment stops the determination until a predetermined time T elapses from a first time point t1, as illustrated in FIG. 2. Here, the predetermined time T is equal to or greater than a time from the first time point t1 at which the first test data is input to the controller 12 to a second time point t2 at which the processed image is input to the controller 12. An item, "Determination Result R2" in FIG. 2 represents one example of the result of the determination in the controller 12. Reference is made to an indication, "-,-,-,-,NG" in Determination Result R2. The indication, "NG" represents a determination that the display control is abnormal. Moreover, the indication, "-" represents either no determination as made, or no determination as made that the display control is abnormal Gist of First Embodiment In the control test apparatus 1 according to the first embodiment, the controller 12 fails to determine whether the display control is abnormal until receiving the processed image. This prevents excessive determination that the display control is abnormal, as indicated by Determination Result R2 in FIG. 2.

It is noted that conducting such a determination in a product test before delivery enables a relatively complex test. However, the display apparatus 61 presumably fails to display the desired image depending on display image superimposition, during the use of the display control apparatus 62 after delivery. Accordingly, such a determination may be conducted during the use of the display control apparatus 62 after delivery.

Second Embodiment

Figure 3:
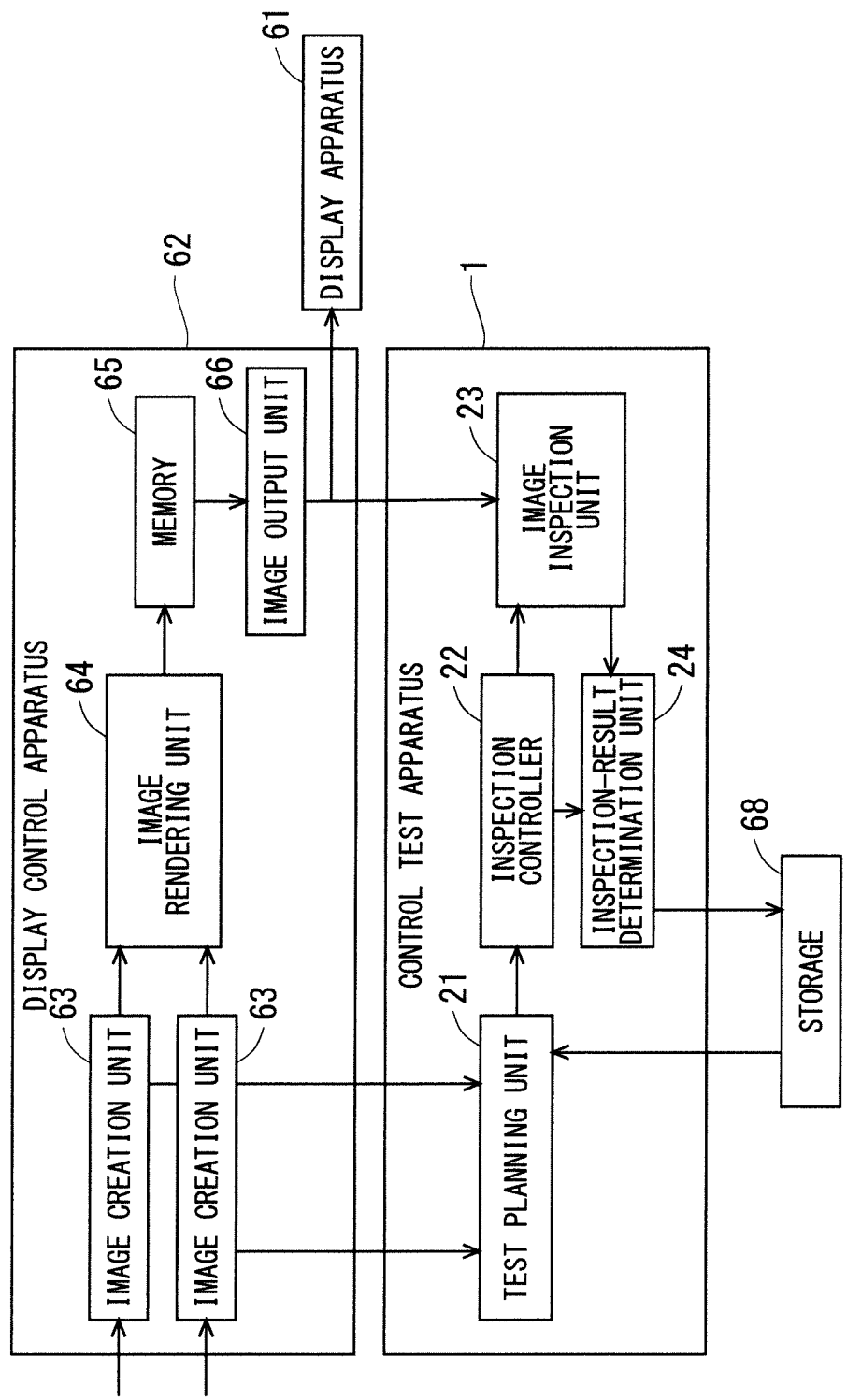
FIG. 3 is a block diagram illustrating the configuration of a control test apparatus according to a second embodiment.

FIG. 3 is a block diagram illustrating the configuration of a control test apparatus according to a second embodiment. Identical or similar components between the first and second embodiments are denoted by the same reference signs. Mainly described herein are different components between the first and second embodiments.

The following describes the display control apparatus 62 according to the second embodiment prior to the control test apparatus 1 according to the second embodiment. The display control apparatus 62 in FIG. 3 includes an image creation unit 63, an image rendering unit 64, a memory 65, and an image output unit 66.

The image creation unit 63 receives an external input. The image creation unit 63 generates an image on the basis of the external input and then outputs the image to the image rendering unit 64, in response to a factor, such as a change in the external input, that leads to display switching. The image creation unit 63 also notifies the control test apparatus 1 of an image change. Examples of the factor leading to display switching include a change in the external input and a status change.

For a car navigation apparatus used as the display control apparatus 62, the image creation unit 63 serves as a map display application that generates, for instance, a map relating to a current position. The image creation unit 63 can also serve as a plurality of applications, such as a map display application and a music play application.

Figure 4:
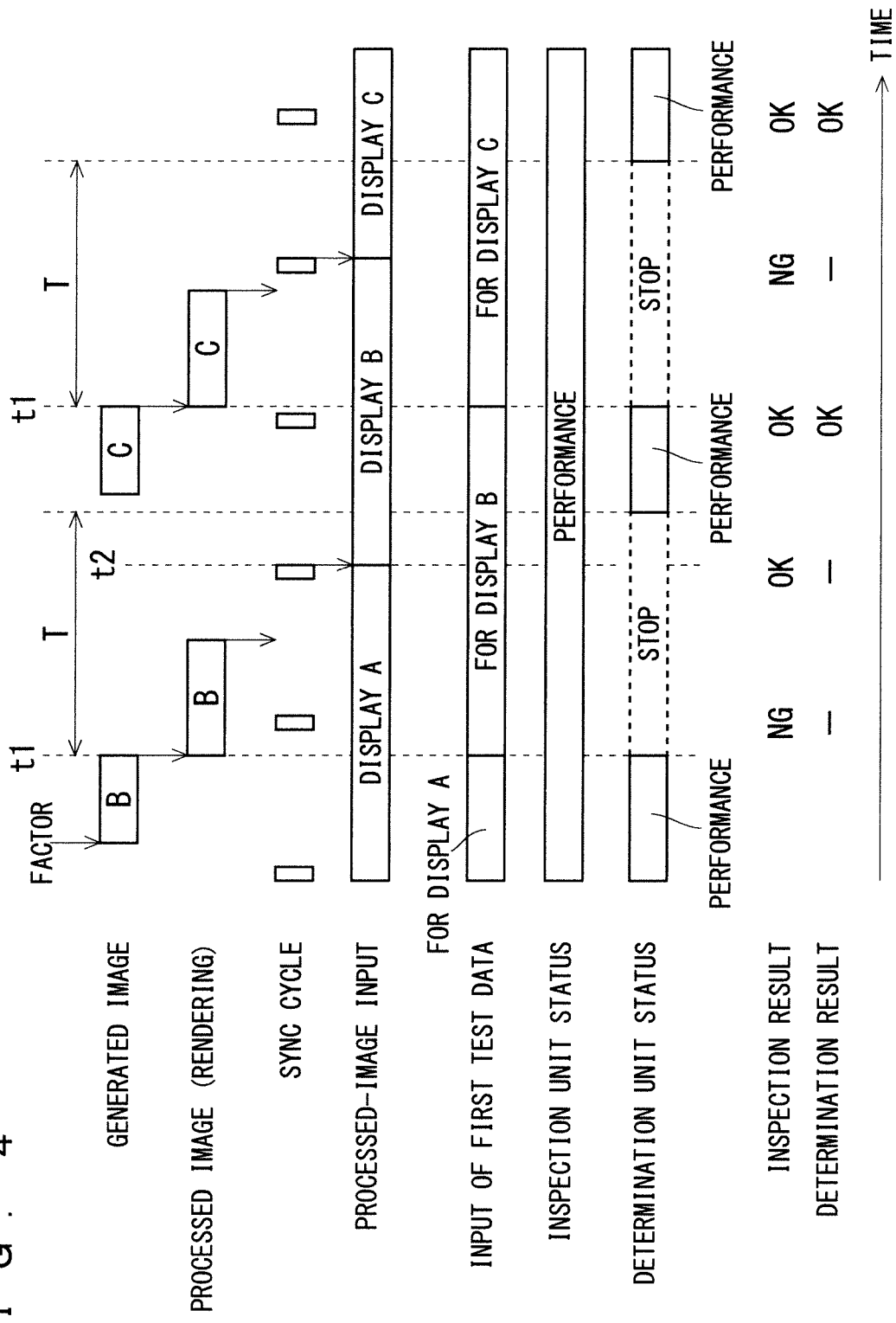
FIG. 4 is a timing chart showing the operation of the control test apparatus according to the second embodiment.

The image rendering unit 64 writes the image as generated in the image creation unit 63, that is, a generated image, into a frame buffer included in the memory 65 through a process such as rendering An item, "Processed Image (Rendering)" in FIG. 4 indicates the timing of rendering into the memory 65. The rendering timing comes after the timing of image generation in the image creation unit 63, indicated by an item, "Generated Image" in FIG. 4.

In the second embodiment, the image rendering unit 64 superimposes a currently displayed image upon the image from the image creation unit 63, and renders a resulting image as superimposed into the memory 65. Such an image rendering unit 64 can serve as a compositor function in a widow system in which the image creation unit 63 is used as client modules, such as a wayland-server and an x server. In this case, provided is image superimposition mainly by software. The image output unit 66, which will be described later on, may superimpose these images. In this case, provided is image superimposition mainly by hardware.

In this embodiment, the image creation unit 63 generates the image, and then the image rendering unit 64 renders the image into the memory 65. In some embodiments, the image creation unit 63 may select an image ID, and then the image rendering unit 64 may render an image consistent with the image ID into the memory 65.

As indicated by an item, "Processed-Image Input" in FIG. 4, the image output unit 66 reads image data of the generated image as stored in the memory 65, in agreement with the cycle of a synchronization (sync) signal, which is a kind of synchronization signal of the display apparatus 61, and then outputs the image data to the control test apparatus 1 and the display apparatus 61. An example of the sync signal is a vertical synchronization (v-sync) signal.

The image, which is read by the image output unit 66 from the memory 65 and is then output, undergoes synchronization for display in the display apparatus 61, and corresponds to the processed image described in the first embodiment. That is, the image output unit 66 outputs the processed image to the control test apparatus 1 and the display apparatus 61 in agreement with the cycle of the sync signal.

Next, the following describes the control test apparatus 1 according to the second embodiment. The control test apparatus 1 in FIG. 3 includes a test planning unit 21, an inspection controller 22, an image inspection unit 23, and an inspection-result determination unit 24.

The test planning unit 21 corresponds to the acquisition unit 11 in the first embodiment. The inspection controller 22, the image inspection unit 23, and the inspection-result determination unit 24 correspond to the controller 12 in the first embodiment. In the second embodiment, the inspection controller 22 is implemented by software; in addition, the image inspection unit 23 and the inspection-result determination unit 24 are included in hardware. The control test apparatus 1, which includes such a combination of the function implemented by software and of hardware, reduces process steps for software development that achieves the control test apparatus 1, simplifies software, and by extension, saves the memory capacity of the display control apparatus 1.

Now, the following outlines the control test apparatus 1 according to the second embodiment. As indicated by items, "Input of First Test Data" and "Processed-Image Input" in FIG. 4, the image inspection unit 23 receives the processed image some time after the image inspection unit 23 receives first test data. The image inspection unit 23, like the same way as the controller 12 in the first embodiment, determines whether display control is abnormal on the basis of the processed image and first test data as input to the image inspection unit 23. Then, The image inspection unit 23 in the second embodiment, like the same in the first embodiment, stops the determination until a predetermined time T elapses from a first time point t1. Here, the predetermined time T is equal to or greater than a time from the first time t1 at which the first test data is input to the image inspection unit 23 to a second time point t2 at which the processed image is input to the image inspection unit 23. This prevents excessive determination that the display control is abnormal.

Next, the following details the components according to the second embodiment.

Upon receiving a notification of an image change from the image creation unit 63, the test planning unit 21 extracts a test item and the first test data that are consistent with an image after change. In a map display application serving as the image creation unit 63, the test planning unit 21 extracts a test item and first test data that are used for half display from a storage 68, in response to a notification of a change from full display to half display. The test planning unit 21 then outputs the test item and first test data as acquired to the inspection controller 22.

Upon receiving the first test data from the test planning unit 21, the inspection controller 22 writes the first test data into the image inspection unit 23 through a process such as output, as indicated by "Input of First Test Data" in FIG. 4. Upon receiving the first test data from the test planning unit 21, the inspection controller 22 also notifies the inspection-result determination unit 24 of a change in the first test data. As such, the inspection-result determination unit 24 is notified of the change in the first test data when the image generated by the image creation unit 63 changes.

The image inspection unit 23 receives the processed image as output from the image output unit 66, and the first test data as output from the inspection controller 22. The image inspection unit 23 inspects, whenever necessary, on the basis of the processed image and the first test data, whether the aforementioned desired image is not input to the display apparatus 61.

In the second embodiment, the image inspection unit 23 determines, on the basis of the processed image and first test data as received, whether the processed image is a desired image that can be checked using the first test data. For instance, the image inspection unit 23 calculates an inspection value, such as a CRC, of the processed image as received, and determines whether the difference between the calculated inspection value of the processed image and an inspection value of the desired image is less than a threshold, the inspection value being contained in the first test data as received. If the difference is less than the threshold, the image inspection unit 23 determines that the processed image as received is a desired image, and at the same time, determines that the desired image is input to the display apparatus 61. If the difference is equal to or more than the threshold, the image inspection unit 23 determines that the processed image as received is not a desired image, and at the same time, determines that the desired image is not input to the display apparatus 61. The image inspection unit 23 periodically performs the inspection in agreement with the cycle of the sync signal.

An item, "Inspection Result" in FIG. 4 shows one example of the result of the inspection in the image inspection unit 23. Reference is made to an indication, "NG,OK,OK,NG,OK". The indication, "OK" indicates an inspection result as obtained that the desired image is input to the display apparatus 61. Moreover, the indication, "NG" indicates an inspection result as obtained that the desired image is not input to the display apparatus 61.

The image inspection unit 23 sends an interrupt and a notification to the inspection-result determination unit 24 in response to both inspection results: one indicating that the desired image is input to the display apparatus 61; and the other indicating that the desired image is not input to the display apparatus 61.

The inspection-result determination unit 24 basically determines that the display control is abnormal when an inspection result is obtained in the image inspection unit 23, indicating that the desired image is not input to the display apparatus 61. The inspection-result determination unit 24 basically determines that the display control is normal when an inspection result is obtained in the image inspection unit 23, indicating that the desired image is input to the display apparatus 61. Examples of display control abnormality include irregularity in an output video image resulting from a failure in the memory 65 and other things.

Upon receiving a notification of a change in the first test data from the inspection controller 22, however, the inspection-result determination unit 24 ignores the interrupt of the image inspection unit 23, which is an inspection result in the image inspection unit 23, and then stops the determination, as indicated by an item, "Determination Unit Status" in FIG. 4. That is, the inspection-result determination unit 24 stops the determination until the predetermined time T elapses from the first time point t1, and performs the determination after the predetermined time T elapses from the first time point t1.

Here, the first time point t1 is a time point at which the first test data is input to the image inspection unit 23, and is substantially a time point at which the inspection-result determination unit 24 receives a notification of a change in the first test data from the inspection controller 22. The predetermined time T is equal to or greater than a time from the first time point t1 to the second time point t2 at which the processed image is input to the image inspection unit 23.

An item, "Determination Result" in FIG. 4 shows one example of the inspection result in the image inspection unit 24. Reference is made to an indication, "-,-,OK,-,OK" in Determination Result. The indication, "OK" represents a determination that the display control is normal. Moreover, the indication, "-" represents no determination as performed. Such a configuration, like the corresponding configuration in the first embodiment, prevents excessive determination that the display control is abnormal.

In the second embodiment, an inspection result that the desired image is not input to the display apparatus 61 can be successively obtained over a predetermined number of times from the first time point t1. This is referred to as a first case, which will be described later on. In the first case, the inspection-result determination unit 24 determines that the display control is abnormal. Moreover, an inspection result that the desired image is not input to the display apparatus 61 can be obtained in relation to a piece of first test data after an inspection result that the desired image is not input to the display apparatus 61 is not obtained in relation to the piece of first test data. In this case, which is referred to as a second case, the inspection-result determination unit 24 determines that the display control is abnormal. It is noted that the inspection-result determination unit 24 may determine that the display control is abnormal in only one of the first and second cases.

The inspection-result determination unit 24 stores the inspection result in the storage 68. Moreover, the inspection-result determination unit 24, in determining that the display control is abnormal, makes an audio output unit, which is not shown, outputs a warning sound, or turns off all displays in the display apparatus 61 to thus perform notification control for notifying a user of display control abnormality.

In the second embodiment, the inspection-result determination unit 24 stores a time history from the first time point t1 to the second time point t2 in the storage 68, and changes the predetermined time T on the basis of the time history. Nevertheless, any component other than the inspection-result determination unit 24 may change the predetermined time T.

<Operation>

Figure 5:
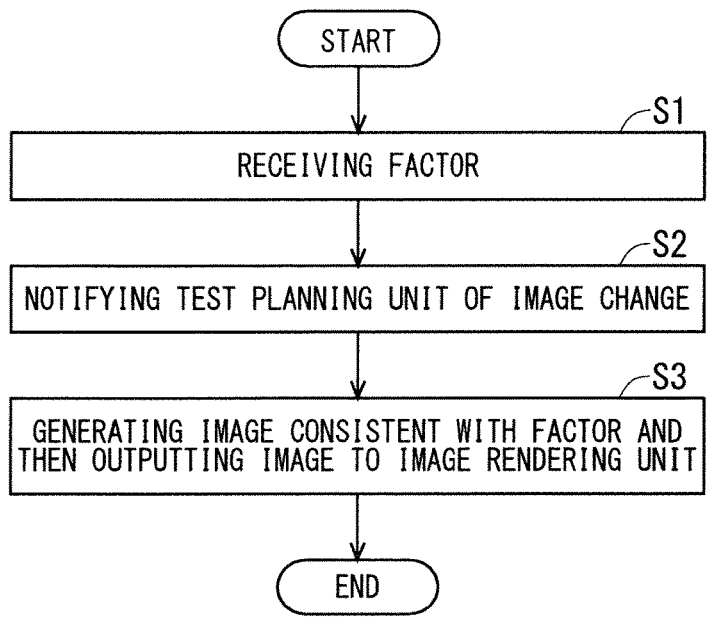
FIG. 5 is a flowchart showing processing in the control test apparatus according to the second embodiment.

FIG. 5 is a flowchart showing image creation according to the second embodiment.

In step S1, the image creation unit 63 firstly receives a factor leading to display switching. In step S2, the image creation unit 63 notifies the test planning unit 21 of an image change. In step S3, the image creation unit 63 creates an image consistent with the factor leading to display switching, and outputs the image to the image rendering unit 64. The processing in FIG. 5 then ends.

Figure 6:
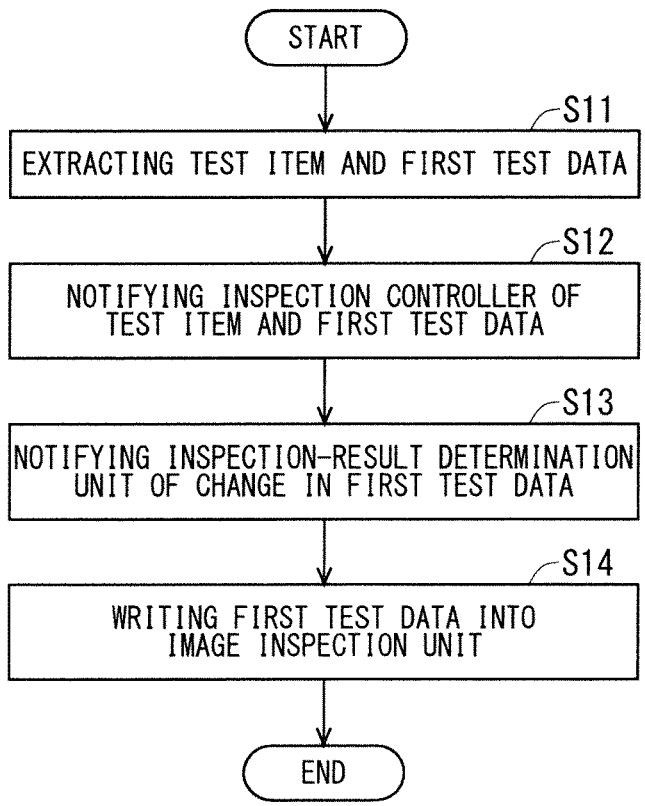
FIG. 6 is a flowchart showing processing in the control test apparatus according to the second embodiment.

FIG. 6 is a flowchart showing test planning according to the second embodiment.

In step S11, upon receiving a notification of the image change, the test planning unit 21 firstly extracts a test item and first test data that are consistent with the image generated in the image creation unit 63. In step S12, the test planning unit 21 notifies the inspection controller 22 of the test item and first test data as extracted.

In step S13, the inspection controller 22 notifies the inspection-result determination unit 24 of a change in the first test data when receiving the first test data from the test planning unit 21. In step S14, the inspection controller 22 writes the first test data into the image inspection unit 23. The processing in FIG. 6 then ends.

Figure 7:
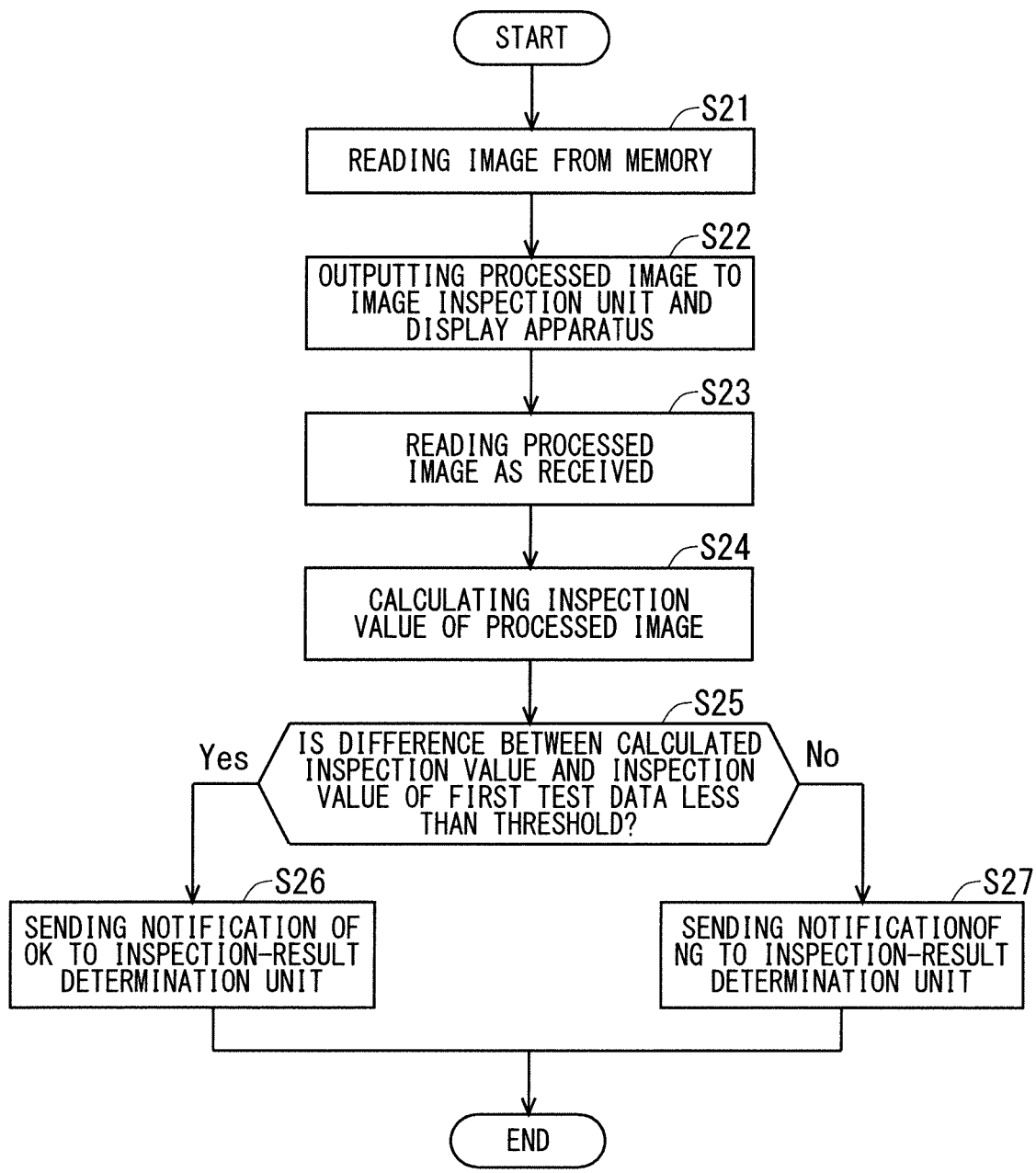
FIG. 7 is a flowchart showing processing in the control test apparatus according to the second embodiment.

FIG. 7 is a flowchart showing image output according to the second embodiment.

In step S21, the image output unit 66 firstly reads the image from the memory 65. In step S22, the image output unit 66 outputs the image as read to the image inspection unit 23 and the display apparatus 61 as a processed image. In step S23, the image inspection unit 23 reads the processed image as received.

In step S24, the image inspection unit 23 calculates an inspection value of the processed image from the processed image as received. In step S25, the image inspection unit 23 determines whether the difference between the inspection value as calculated and an inspection value contained in the first test data is less than a threshold. If the difference is less than the threshold, the processing proceeds to step S26; If the difference is equal to or more than the threshold, to step S27.

For proceeding from step S25 to step S26, the image inspection unit 23 sends, to the inspection-result determination unit 24, a notification of OK, that is, an inspection result that the desired image is input to the display apparatus 61. The processing in FIG. 7 then ends. For proceeding from step S25 to step S27, the image inspection unit 23 sends, to the inspection-result determination unit 24, a notification of NG, that is, an inspection result that the desired image is not input to the display apparatus 61. The processing in FIG. 7 then ends.

Figure 8:
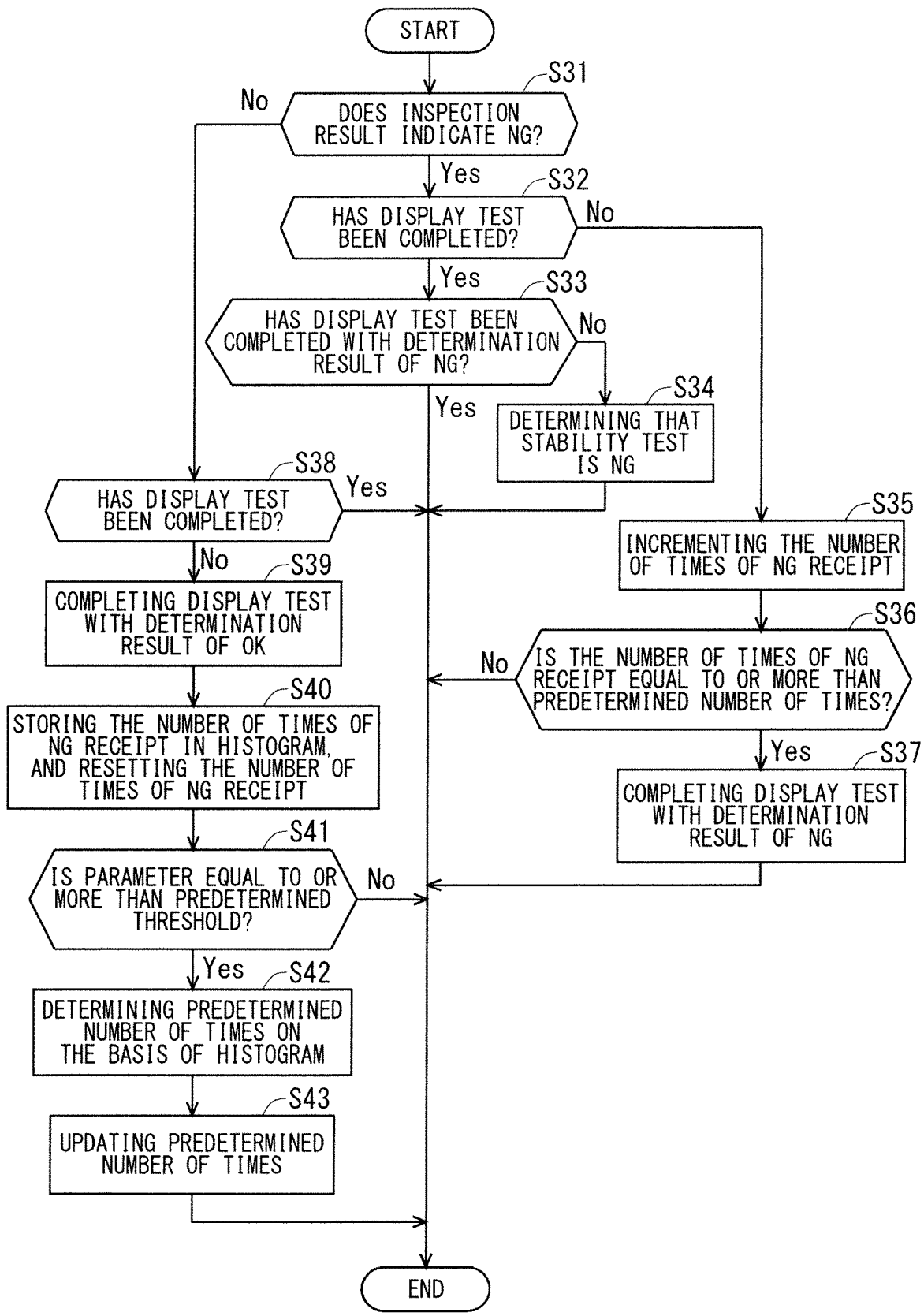
FIG. 8 is a flowchart showing processing in the control test apparatus according to the second embodiment.

FIG. 8 is a flowchart showing inspection result determination according to the second embodiment. This processing is performed when the inspection-result determination unit 24 receives a notification of OK or NG from the image inspection unit 23.

In step S31, the inspection-result determination unit 24 firstly determines whether the inspection result in the image inspection unit 23 is NG. If the inspection result is NG, the processing proceeds to step S32; If the inspection result is OK, to step S38.

In step S32, the inspection-result determination unit 24 determines whether a display test has been completed. The display test herein is a test in which the inspection-result determination unit 24 determines whether the display control is OK or NG, from a time point of receiving a notification of a change in a piece of first test data, on the basis of a plurality of inspection results obtained in the image inspection unit 23 in relation to the piece of first test data. In a determination that the display test has been completed, the processing proceeds to step S33. In a determination that the display test has not yet been completed, the processing proceeds to step S35.

For proceeding from step S32 to step S33, the inspection-result determination unit 24 determines whether the display test has been completed with a determination result of NG. In response to a determination that the display test has been completed with the determination result of NG, the processing in FIG. 8 ends. In response to a determination that the display test has been completed with a determination result of OK, the processing proceeds to step S34.

Herein, proceeding from step S33 to step S34 means that an inspection result of NG has been obtained in relation to the piece of first test data after the obtainment of an inspection result of OK in relation to the piece of first test data. In other words, the proceeding from step S33 to step S34 means that the inspection result that the desired image is not input to the display apparatus 61 has been obtained in relation to the piece of first test data after the inspection result that the desired image is not input to the display apparatus 61 is not obtained in relation to the piece of first test data.

In step S34, the inspection-result determination unit 24 accordingly determines that a stability test is NG. The stability test herein is a test for checking that desired images are continuously input to the display apparatus 61. The wording, "a stability test is NG" means that desired images are not continuously input to the display apparatus 61. An example of this state is one in which a desired image and an undesired image are alternately input to the display apparatus 61. After step S34, the processing in FIG. 8 ends.

For proceeding from step S32 to step S35, the inspection-result determination unit 24 increments the number of times of NG receipt. In step S36, the inspection-result determination unit 24 determines whether the number of times of NG receipt as incremented from the first time point t1 is equal to or more than a predetermined number of times. Here, the predetermined time T corresponds to the predetermined number of times. In addition, the predetermined time T lengthens when the predetermined number of times increases; moreover, the predetermined time T shortens when the predetermined number of times decreases. In a determination that the number of times of NG receipt is equal to or more than the predetermined number of times, the processing proceeds to step S37. In a determination that the number of times of NG receipt is less than the predetermined number of times, the processing in FIG. 8 ends.

For proceeding from step S36 to step S37, the inspection result that the desired image is not input to the display apparatus 61 has been obtained over the predetermined number of times from the first time point t1. In such a case, the inspection-result determination unit 24 completes the display test with a determination result of NG. The processing in FIG. 8 then ends.

For proceeding from step S31 to step S38, the inspection-result determination unit 24 determines whether the display test has been completed. If the display test has been completed, the processing in FIG. 8 ends. If the display test has not been completed, the processing proceeds to step S39. For proceeding from step S38 to step S39, the inspection-result determination unit 24 completes the display test with a determination result of OK. The processing then proceeds to step S40.

As a result of a series of processing from step S40 though step S43, the predetermined number of times is updated into a suitable number of times on the basis of the time history from the first time point t1 to the second time point t2. Consequently, the predetermined time T, corresponding to the predetermined number of times, is updated into a suitable time. To be specific, the inspection-result determination unit 24, in step S40, firstly stores, as histogram bins, the number of times of NG receipt as incremented in step S35, and at the same time, resets the number of times of NG receipt.

In step S41, the inspection-result determination unit 24 determines whether the number of data pieces, i.e., parameter, of the number of times of NG receipt is equal to or more than a predetermined threshold. If the parameter is equal to or more than the predetermined threshold, the processing proceeds to step S42. If the parameter is less than the predetermined threshold, the processing in FIG. 8 ends.

In step S42, the inspection-result determination unit 24 determines a predetermined number of times on the basis of the histogram. For instance, the inspection-result determination unit 24 determines, as a predetermined number of times, the number of times of NG receipt that has a highest histogram bin or the number of times of NG receipt that has a highest histogram frequency.

In step S43, the inspection-result determination unit 24 updates a predetermined number of times used in step S36 into the predetermined number of times as determined in step S42. The processing in FIG. 8 then ends.

Gist of Second Embodiment

In the control test apparatus 1 according to the second embodiment, the inspection-result determination unit 24 stops the determination until the predetermined time T elapses from the first time point t1, and performs the determination after the predetermined time T elapses from the first time point t1. Such a configuration, like the corresponding configuration in the first embodiment, prevents excessive determination that the display control is abnormal.

In the second embodiment, the inspection-result determination unit 24 determines that the display control is abnormal in at least one of a case where an inspection result that the desired image is not input to the display apparatus 61 is successively obtained over a predetermined number of times from the first time point t1, and a case where an inspection result that the desired image is not input to the display apparatus 61 is obtained in relation to a piece of first test data after an inspection result that the desired image is not input to the display apparatus 61 is not obtained in relation to the piece of first test data. Such a configuration enables checking the display control for various abnormalities.

<Modification>

The image inspection unit 23 in the second embodiment is configured to provide an inspection result of OK and an inspection result of NG. Alternatively, the image inspection unit 23 may be configured to not to provide an inspection result of OK, but to provide an inspection result of NG. In this case, the image inspection unit 23 may generate an interrupt in the inspection-result determination unit 24 in response to the inspection result of NG. Furthermore, the inspection-result determination unit 24 may determine that the display control is normal in response to, for instance, no inspection result as obtained for a certain time period or longer, the inspection result indicating that the desired image is not input to the display apparatus 61. An example of the certain time period is a time period twice as long as the cycle of the sync signal. The following details such a configuration of the control test apparatus 1 according to a modification.

Figure 9:
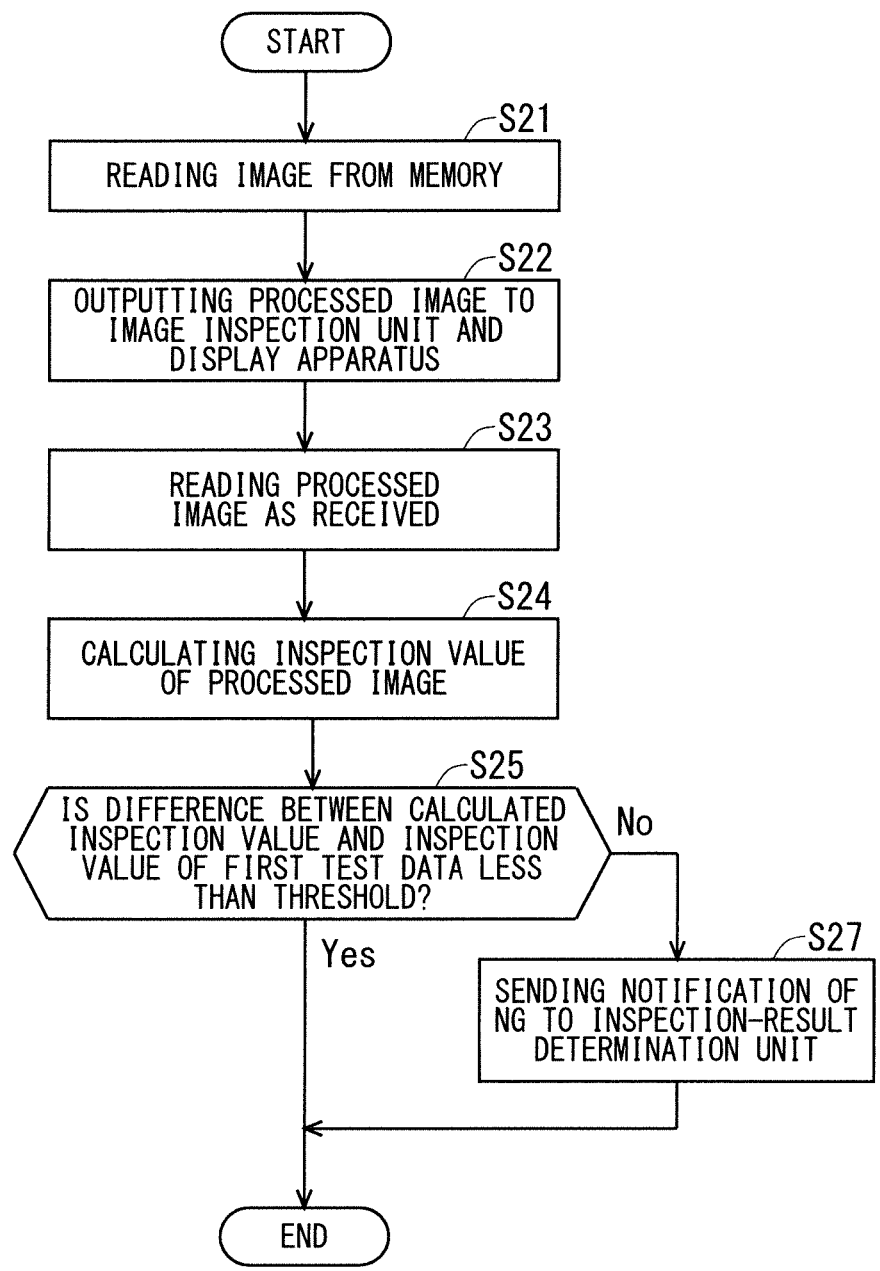
FIG. 9 is a flowchart showing processing in a control test apparatus according to a modification.

FIG. 9 is a flowchart showing image output according to the modification. As shown in FIG. 9, the image output according to the modification is similar to the image output (FIG. 7) according to the second embodiment with exception that step S26 is excluded.

Figure 10:
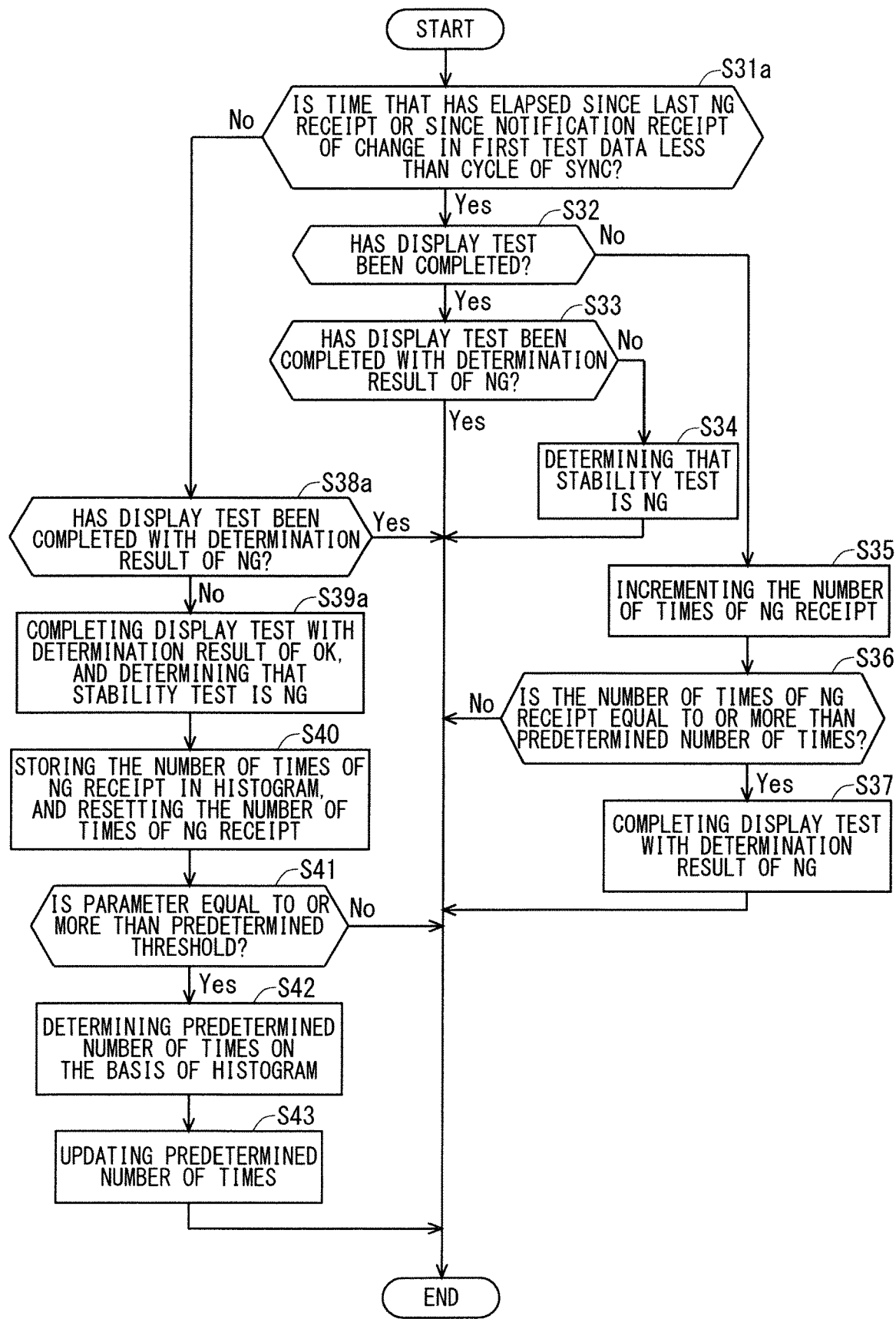
FIG. 10 is a flowchart showing processing in the control test apparatus according to the modification.

FIG. 10 is a flowchart showing inspection result determination according to the modification. This processing is performed when the inspection-result determination unit 24 receives a notification of NG from the image inspection unit 23.

As shown in FIG. 10, the inspection result determination according to the modification is similar to the inspection result determination (FIG. 8) according to the second embodiment with exception that steps S31, S38, and S39 are replaced with steps S31a, S38a, and S39a. The following mainly describes steps S31a, S38a, and S39a.

In step S31a, the inspection-result determination unit 24 determines whether a time that has elapsed since the last NG receipt is less than the cycle of a v-sync signal, which is a sync signal, and at the same time, determines whether a time that has elapsed since notification receipt of a change in the first test data is less than the cycle of the v-sync signal. If the inspection-result determination unit 24 determines that the time that has elapsed from the last NG receipt is less than the cycle of the v-sync, or if the inspection-result determination unit 24 determines that the time that has elapsed from the notification receipt of the change in the first test data is less than the cycle of the v-sync signal, the processing proceeds to step S32; otherwise, to step S38a.

Herein, proceeding from step S31a to step S32 means that not only a current inspection has provided a result of NG that triggers the starting of an interrupt in FIG. 10, but also an inspection immediately before the current inspection has provided a result of NG. In other words, this means that the image inspection unit 23 has made successive determinations of NG. In this case, a display test must be determined to be NG, or a stability test must be determined to be NG. Accordingly, processing from step S32 to step S37 in FIG. 10 is similar to the processing from step S32 to step S37 in FIG. 8, which is performed in response to a determination in step S31 that the image inspection unit 23 has provided an inspection result of NG.

Meanwhile, proceeding from step S31a to step S38a means that an inspection immediately before a current inspection providing a result of NG, which triggers the starting of the processing in FIG. 10, has provided a result of non-NG, and that the immediately preceding inspection has substantially provided a result of OK. Accordingly, processing from step S38a to step S43 in FIG. 10 is similar to the processing from step S38 to step S43 in FIG. 8, which is performed in response to a determination in step 31 that the image inspection unit 23 has provided an inspection result of OK.

In this modification, however, the inspection-result determination unit 24 determines, in step S38a, whether a display test has been completed with a determination result of NG. If the display test has been completed with a determination result of NG, the processing in FIG. 10 ends. If the display test has not been completed with a determination result of NG, the processing proceeds to step S39a.

For proceeding to step S39a, the display test has been completed with a determination result of OK, and a current inspection provides a result of NG. Thus, the inspection-result determination unit 24 completes the display test with a determination result of OK, and at the same time, determines that a stability test is NG.

Figure 11:
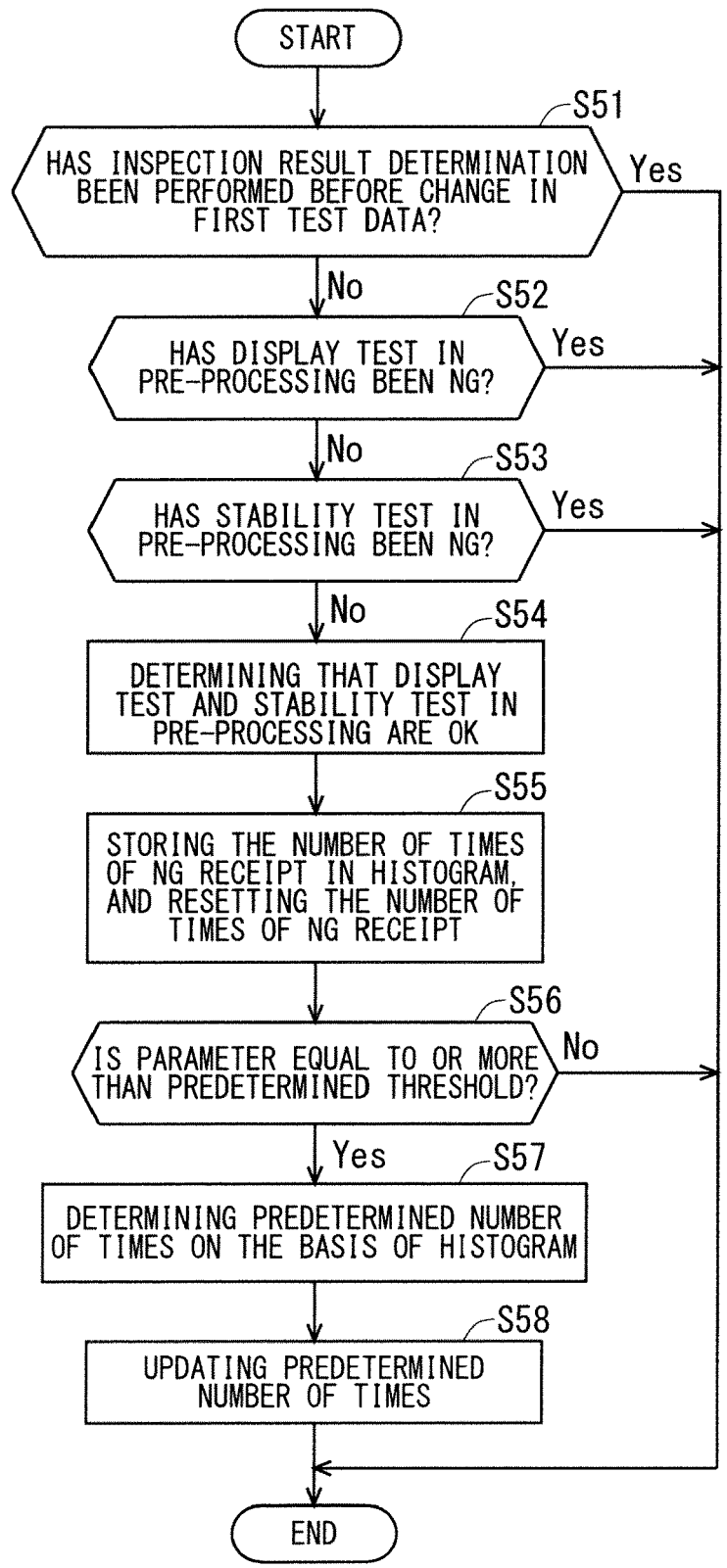
FIG. 11 is a flowchart showing processing in the control test apparatus according to the modification.

FIG. 11 is a flowchart showing correction according to the modification. The processing of inspection result determination in FIG. 10 is performed when the inspection-result determination unit 24 receives a notification of NG from the image inspection unit 23. Accordingly, the processing in FIG. 10 alone fails to determine that display status is OK and that a stability test is OK in response to the change in the first test data without NG notification receipt from the image inspection unit 23, that is, in response to continuous inspection results of OK. The correction in FIG. 11 is performed to correct such a failure. This correction is performed when the inspection-result determination unit 24 receives a notification of the change in the first test data from the image inspection unit 22.

In step S51, the inspection-result determination unit 24 firstly determines whether it has performed an inspection result determination before notified of a change in the first test data. In this determination, the inspection-result determination unit 24 checks a determination result stored in the storage 68, for instance. If the inspection result determination has been performed, the processing proceeds to step S52. If the inspection result determination has not been performed, the processing in FIG. 11 ends. Hereinafter, an inspection result determination before receipt of a notification of the change in the first test data is referred to as a "prior determination".

In step S52, the inspection-result determination unit 24 determines whether a display test in the prior determination is NG. If determination that the display test in the prior determination is NG is made, the processing in FIG. 11 ends. If determination that the display test in the prior determination is NG is not made, the processing proceeds to step S53.

In step S53, the inspection-result determination unit 24 determines whether a stability test in the prior determination is NG. If determination that the stability test in the prior determination is NG is made, the processing in FIG. 11 ends. If determination that the stability test in the prior determination is NG is not made, the processing proceeds to step S54.

In step S54, the inspection-result determination unit 24 determines that the display test and the stability test in the prior determination are OK. Then, steps S55 through S58 are similar to step S40 through step S43 in FIG. 10, and then the processing in FIG. 11 ends.

A series of processing from FIG. 9 through FIG. 11 achieves an effect similar to that in the second embodiment.

It is noted that in another modification, the image inspection unit 23 may be configured to not to provide an inspection result of NG, but to provide an inspection result of OK. In response to the inspection result of OK, the image inspection unit 23 may generate an interrupt in the inspection-result determination unit 24. Alternatively, the inspection-result determination unit 24 may be configured to access the image inspection unit 23 in a certain cycle, for instance, in agreement with the cycle of the sync signal, rather than the aforementioned configuration in which the image inspection unit 23 generates an interrupt in the inspection-result determination unit 24. It is noted that the foregoing modification is applicable to a third embodiment and the subsequent embodiments, which will be described later on.

Third Embodiment

The block configuration of a display control apparatus according to a third embodiment of the present invention is identical to that of the display control apparatus (FIG. 3) according to the second embodiment. Identical or similar components between the second and third embodiments are denoted by the same reference signs. Mainly described herein are different components between the second and third embodiments.

In the second embodiment, the inspection-result determination unit 24 controls the performance and stop of the determination about display control abnormality. In the third embodiment by contrast, the inspection controller 22 controls the performance and stop of an inspection in the image inspection unit 23, to thus control the performance and stop of a determination about display control abnormality. The following details such a configuration of the control test apparatus 1 according to the third embodiment.

Figure 12:
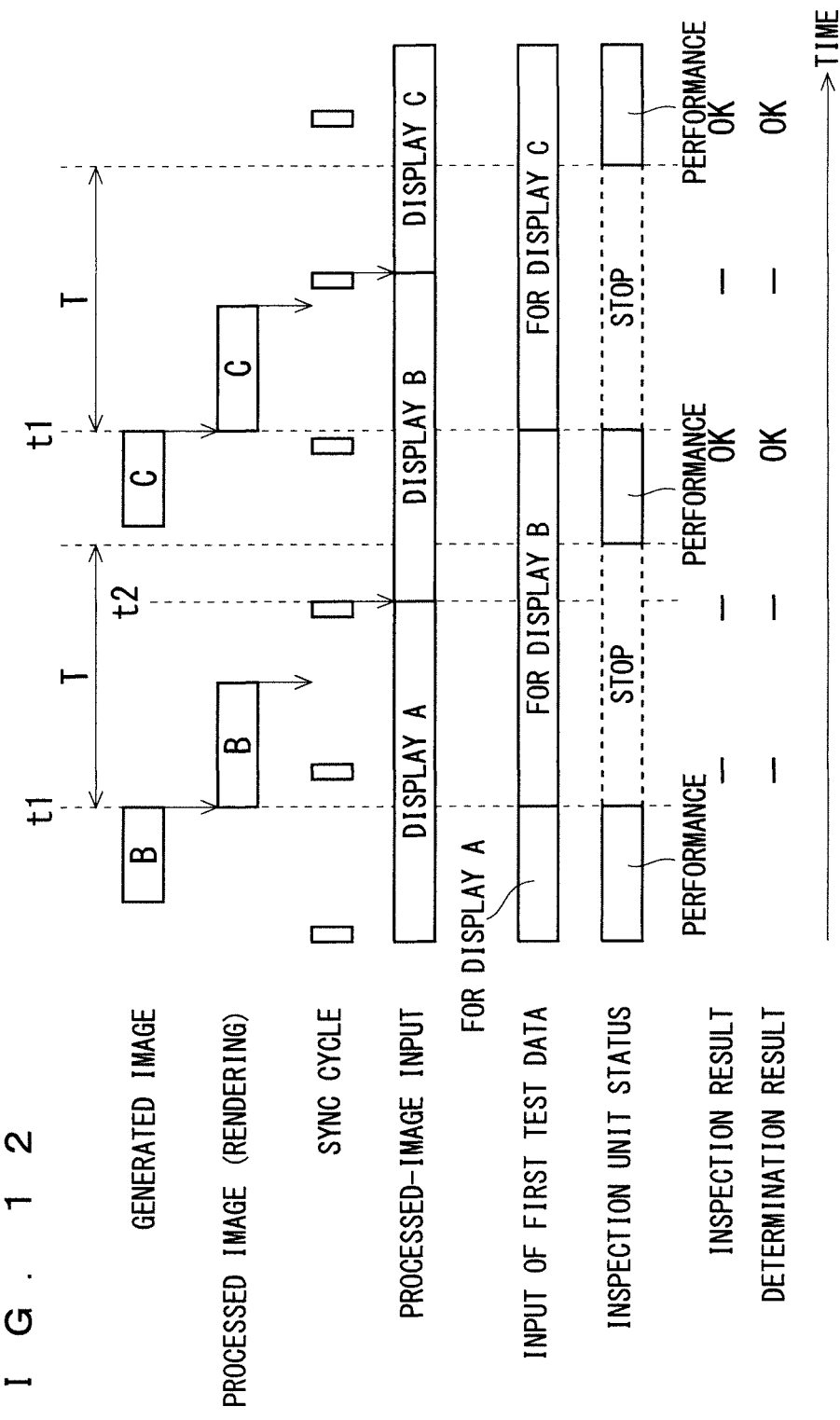
FIG. 12 is a timing chart showing the operation of a control test apparatus according to a third embodiment.

Upon receiving first test data from the test planning unit 21, the inspection controller 22 writes the first test data into the image inspection unit 23 through a process such as output, as indicated by an item, "Input of First Test Data" in FIG. 12. Upon receiving the first test data from the test planning unit 21, the inspection controller 22 also controls inspection in the image inspection unit 23.

Herein, as indicated by an item, "Inspection Unit Status" in FIG. 12, the inspection controller 22 stops the image inspection unit 23 from performing an inspection until a predetermined time T elapses from a first time point t1, and allows the image inspection unit 23 to perform the inspection after the predetermined time T elapses from the first time point t1. The first time point t1 is a time point at which the first test data is input to the image inspection unit 23, and is substantially a time point at which the inspection controller 22 receives the first test data from the test planning unit 21. The predetermined time T is equal to or greater than a time from the first time point t1 to a second time point t2 at which a processed image is input to the image inspection unit 23.

The image inspection unit 23 basically, periodically performs an inspection similar to that described in the second embodiment in agreement with the cycle of a sync signal. However, the image inspection unit 23 stops this inspection in accordance with the control in the inspection controller 22, as necessary.

The inspection-result determination unit 24 determines that display control is abnormal when an inspection result that a desired image is not input to the display apparatus 61 is obtained in the image inspection unit 23. The inspection-result determination unit 24 determines that the display control is normal when an inspection result that the desired image is input to the display apparatus 61 is obtained in the image inspection unit 23.

An item, "Inspection Result" in FIG. 12 shows one example of the inspection result in the image inspection unit 23. Moreover, an item, "Determination Result" in FIG. 12 shows one example of the determination result. In the third embodiment, the inspection result in the image inspection unit 23 is substantially identical to the determination result in the inspection-result determination unit 24, as shown in FIG. 12.

<Operation>

Figure 13:
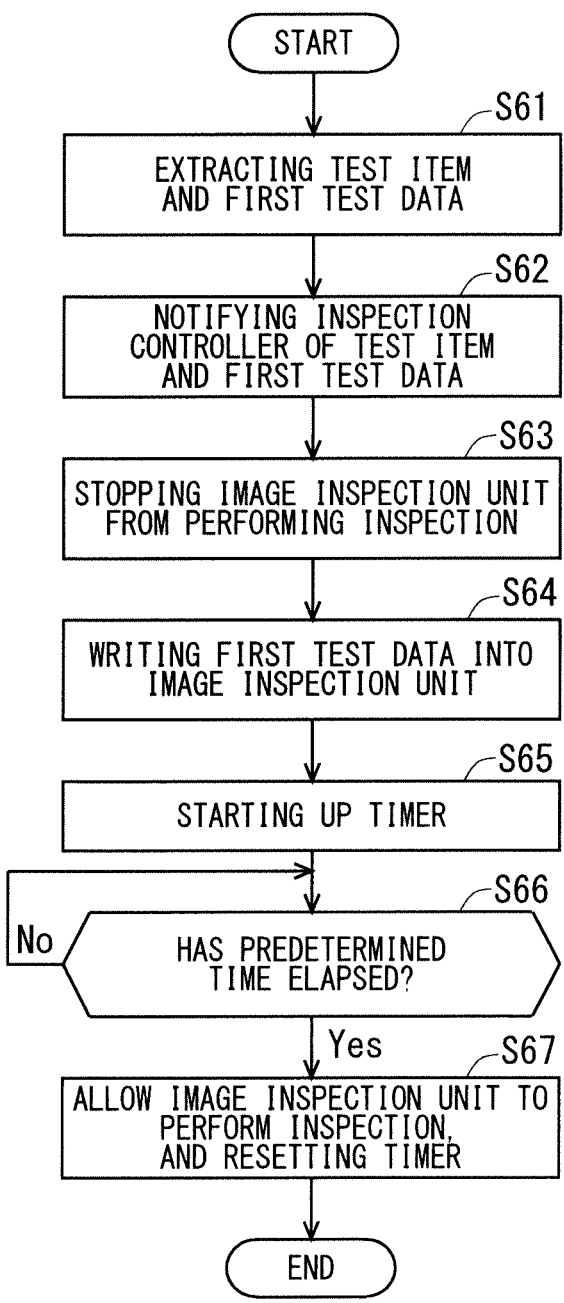
FIG. 13 is a flowchart showing processing in the control test apparatus according to the third embodiment.

FIG. 13 is a flowchart showing test planning according to the third embodiment.

In step S61, upon receiving a notification of an image change, the test planning unit 21 firstly extracts a test item and first test data that are consistent with an image generated in the image creation unit 63. In step S62, the test planning unit 21 notifies the inspection controller 22 of the test item and first test data as extracted.

In step S63, upon receiving the first test data from the test planning unit 21, the inspection controller 22 stops the image inspection unit 23 from performing an inspection to render the inspection invalid. In step S64, the inspection controller 22 writes the first test data into the image inspection unit 23. In step S65, the inspection controller 22 starts up a timer.

In step S66, the inspection controller 22 determines whether the a time in the timer is equal to or greater than the predetermined time T, that is, whether the predetermined time T has elapsed from the time point of receipt of the first test data from the test planning unit 21. This determination is performed independently of the cycle of the sync signal. If the predetermined time T is determined to have elapsed, the processing proceeds to step S67; otherwise, the processing returns to step S66. In step S67, the inspection controller 22 allows the image inspection unit 23 to perform the inspection to render the inspection valid, and at the same time, resets the timer. The processing in FIG. 13 then ends.

Figure 14:
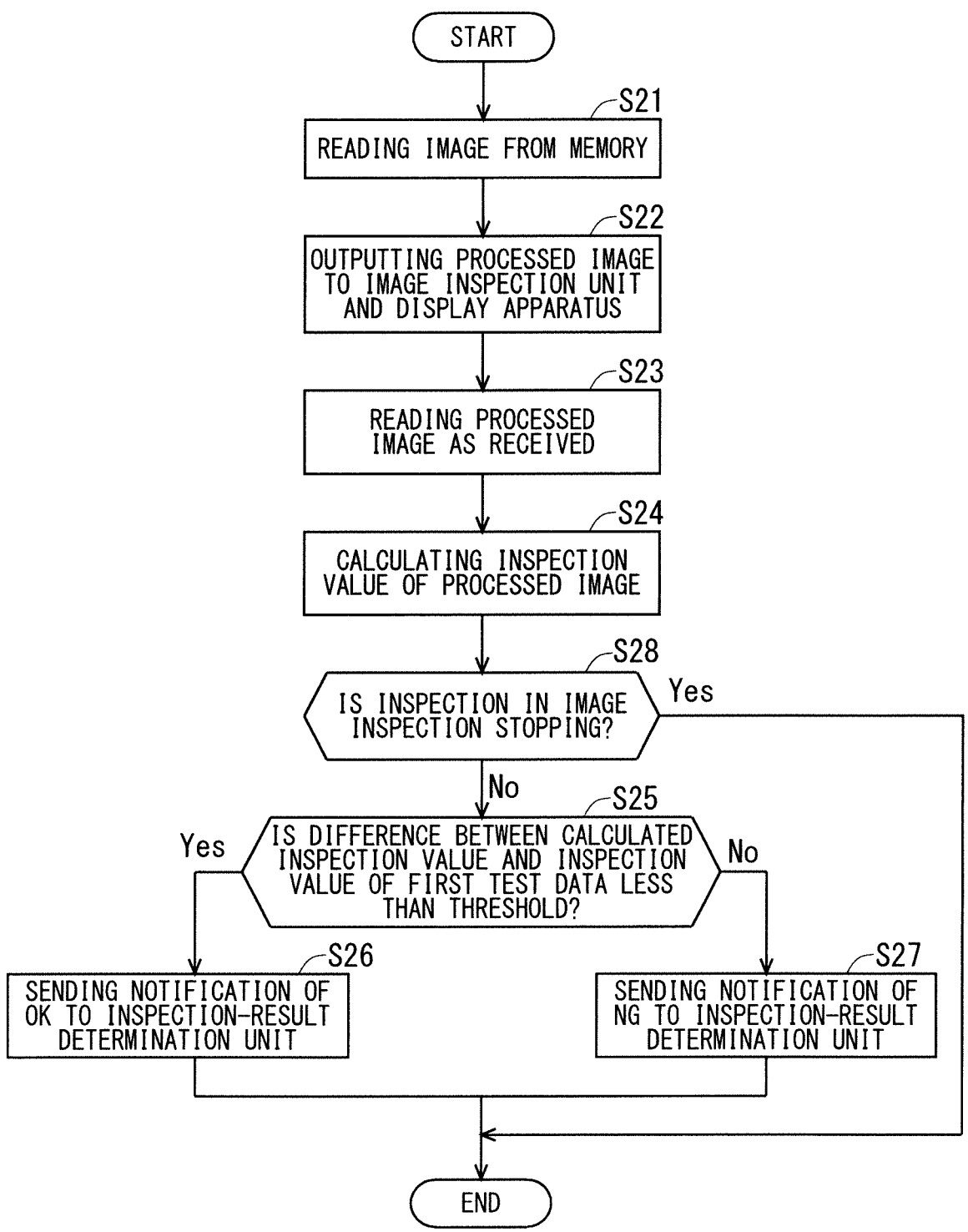
FIG. 14 is a flowchart showing processing in the control test apparatus according to the third embodiment.

FIG. 14 is a flowchart showing image output according to the third embodiment. As shown in FIG. 14, the image output according to the third embodiment is similar to the image output (FIG. 7) according to the second embodiment with the exception of additional step S28. The following mainly describes steps S28.

After steps S21 through S24, the processing in FIG. 14 ends in a determination in step S28 that the image inspection unit 23 is stopping the inspection; further, the processing proceeds to step S25 in a determination in step S28 that the image inspection unit 23 is under inspection, thus performing processing subsequent to step S25.

Gist of Third Embodiment

In the control test apparatus 1 according to the third embodiment, the image inspection unit 23 is made to stop the inspection until the predetermined time T elapses from the first time point t1, and is allowed to perform the inspection after the predetermined time T elapses from the first time point t1. In addition, the inspection-result determination unit 24 determines that the display control is abnormal when the inspection result that the desired image is not input to the display apparatus 61 is obtained in the image inspection unit 23. Such a configuration, like the corresponding configuration in the first embodiment, prevents excessive determination that the display control is abnormal.

Fourth Embodiment

The block configuration of a display control apparatus according to a fourth embodiment of the present invention is identical to that of the display control apparatus (FIG. 3) according to the second embodiment. Identical or similar components between the second and fourth embodiments are denoted by the same reference signs. Mainly described herein are different components between the second and fourth embodiments.

The display control apparatus 62 generates two generated images, and sequentially outputs two processed images corresponding to the two generated images to both of the display apparatus 61 and the control test apparatus 1.

In the fourth embodiment, the image creation unit 63 generates two images on the basis of an external input. An item, "Generated Image" in FIG. 15 indicates that images B and C are generated as two generated images. The image creation unit 63 outputs the two generated images to the image rendering unit 64, and at the same time, notifies changes in the two generated images to the test planning unit 21 of the control test apparatus 1. It is noted that the image creation unit 63, when generating three or more images, may use any two of these images as two generated images in the following description.

Figure 15:
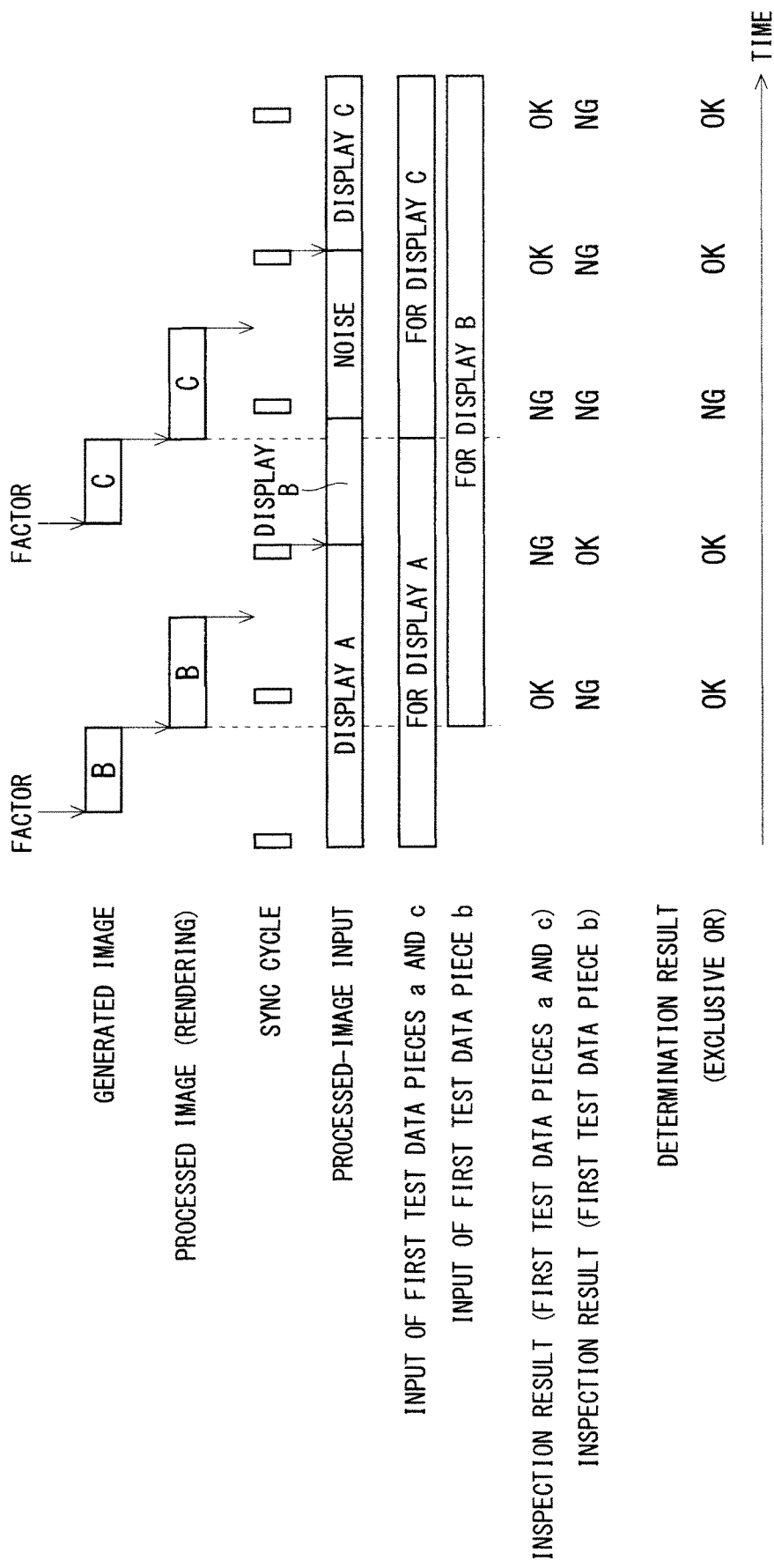
FIG. 15 is a timing chart showing the operation of a control test apparatus according to a fourth embodiment.

The two generated images, generated in the image creation unit 63, are sequentially output, as the two processed images, from the image output unit 66 through the image rendering unit 64 and the memory 65 to both of the display apparatus 61 and the control test apparatus 1. Accordingly, the two processed images are sequentially input to the image inspection unit 23 of the control test apparatus 1. An item, "Processed-Image Input" in FIG. 15 indicates that processed images B and C are sequentially input to the image inspection unit 23 as two processed images. In the example of FIG. 15, an unintentional noise between the processed images B and C is input to the image inspection unit 23, and by extension, to the display apparatus 61.

Upon receiving a notification of the changes in the two generated images from the image creation unit 63, the test planning unit 21 extracts pieces of first test data about two desired images corresponding to the two generated images. These pieces of first test data, extracted in the test planning unit 21, are input to the image inspection unit 23 via the inspection controller 22. FIG. 15 shows that first test data pieces b and c about the desired images corresponding to the generated images B and C are input to the image inspection unit 23. FIG. 15 also shows that a first test data piece a about a desired image corresponding to a generated image A has been input to the image inspection unit 23 prior to the first test data piece c.

The image inspection unit 23 performs, in parallel, two inspections using the two pieces of first test data that have been input. Each inspection is similar to that described before. The fourth embodiment applies first-in first-out to inspection using the first test data pieces. This method enables the image inspection unit 23 to use two fresh pieces of first test data for its inspection, as shown in FIG. 15.

FIG. 15 shows the result of an inspection using the first test data piece c after the first test data piece a, and the result of an inspection using the first test data piece b. The inspection using the first test data piece a provides a result of OK when the desired image corresponding to the processed image A is input to the inspection controller 22, and provides a result of NG when the other images are input to the inspection controller 22. The inspections using the first test data pieces b and c are similar to the inspection using the first test data piece a with exception that the processed image A is replaced with the processed images B and C. An item, "Inspection Result" in FIG. 15 shows one example of the results of the two inspections using the two pieces of first test data.

When the image inspection unit 23 uses the two pieces of first test data, thereby obtaining two inspection results in parallel, the inspection-result determination unit 24 determines, on the basis of the two inspection results, whether control in the display control apparatus 62 over the display apparatus 61 is abnormal, regardless of whether a predetermined time T has elapsed from a first time point t1. The inspection-result determination unit 24 in the fourth embodiment performs the determination by applying an exclusive OR that uses OK as "0" and NG as "1" to the two inspection results as obtained in the image inspection unit 23. Such an inspection-result determination unit 24 determines that display control is not abnormal in response to two different inspection results obtained in the image inspection unit 23, and determines that the display control is abnormal in response to two identical inspection results obtained in the image inspection unit 23.

An item, "Determination Result" in FIG. 15 shows one example of the result of the exclusive OR applied to the two inspection results. According to the aforementioned configuration, a determination of NG, as indicated by "Determination Result" in FIG. 15, is made in response to the input of the unintentional noise to the image inspection unit 23, and by extension, to the display apparatus 61, as indicated by "Processed-Image Input" in FIG. 15.

<Operation>

Figure 16:
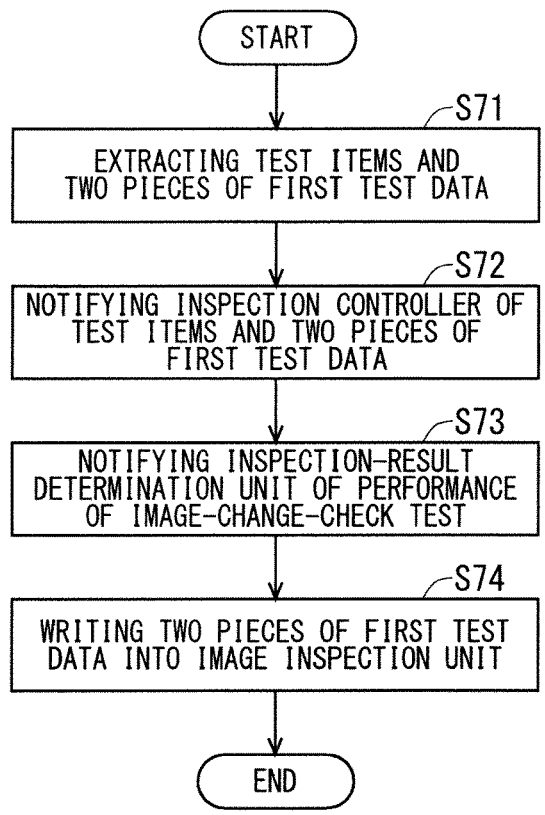
FIG. 16 is a flowchart showing processing in the control test apparatus according to the fourth embodiment.

FIG. 16 is a flowchart showing test planning according to the fourth embodiment.

In step S71, upon receiving a notification of an image change, the test planning unit 21 firstly extracts test items and two pieces of first test data that are consistent with two images generated in the image creation unit 63. Accordingly, a first test data piece about one image and a first test data piece about another image that is displayed subsequently to the one image. In step S72, the test planning unit 21 notifies the inspection controller 22 of the test items and two pieces of first test data as extracted.

In step S73, upon receiving the two pieces of first test data consistent with the two images from the test planning unit 21, the inspection controller 22 notifies the inspection-result determination unit 24 of the performance of an image-change-check test.

In step S74, the inspection controller 22 writes the two pieces of first test data consistent with the two images into the image inspection unit 23. The processing in FIG. 16 then ends.

Although not shown, upon receiving a notification of the performance of the image-change-check test, the inspection-result determination unit 24 switches to an image-change-check testing mode in which the inspection-result determination unit 24 performs the determination on the basis of the two inspection results obtained in the image inspection unit 23.

Figure 17:
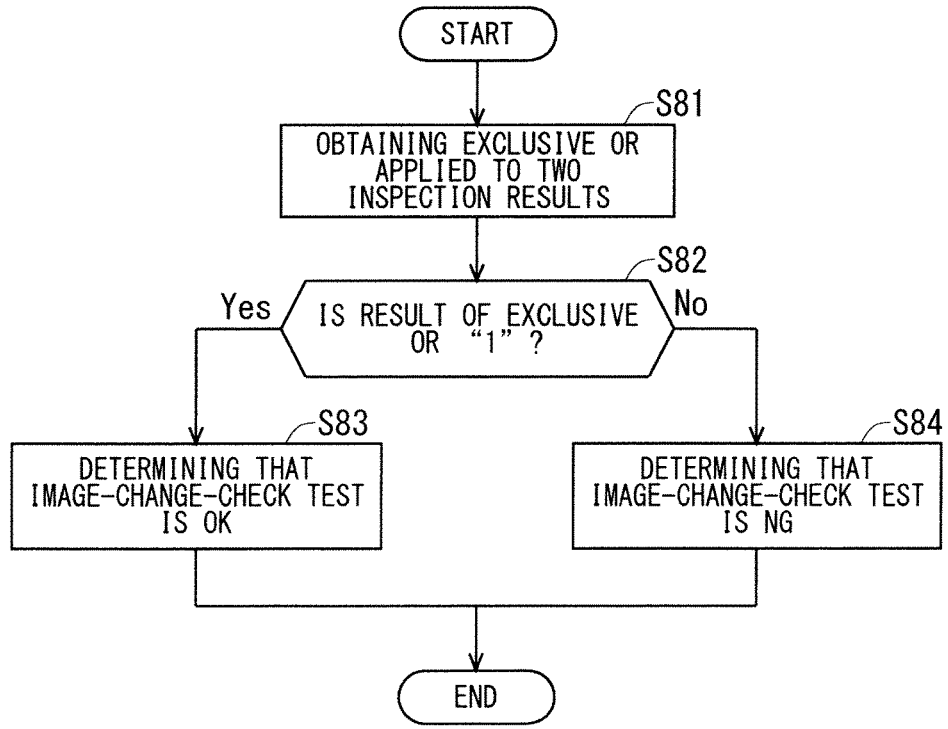
FIG. 17 is a flowchart showing processing in the control test apparatus according to the fourth embodiment.

FIG. 17 is a flowchart showing processing in image-change-check testing mode according to the fourth embodiment. This processing is performed when the inspection-result determination unit 24 that has switched to the image-change-check testing mode receives inspection results from the image inspection unit 23.

In step S81, the inspection-result determination unit 24 firstly obtains an exclusive OR applied to the two inspection results as obtained in the image inspection unit 23. In step S82, the inspection-result determination unit 24 determines whether the result of the exclusive OR is "1". If the result of the exclusive OR is determined to be "1", that is, if the two inspection results are determined to be different, the processing proceeds to step S83. If the result of the exclusive OR is determined to be "0", that is, if the two inspection results are determined to be identical, the processing proceeds to step S84.

In step S83, the inspection-result determination unit 24 determines that the display control is normal, that is, the image-change-check test is OK. The processing in FIG. 17 then ends. In step S84, the inspection-result determination unit 24 determines that the display control is abnormal, that is, the image-change-check test is NG, and then stores the result of the determination in the storage 68. The processing in FIG. 17 then ends.

Gist of Fourth Embodiment

When the two inspection results is obtained in parallel in the image inspection unit 23 using the two pieces of first test data, the control test apparatus 1 according to the fourth embodiment determines, on the basis of the two inspection results, whether the control in the display control apparatus 62 over the display apparatus 61 is abnormal, regardless of whether the predetermined time T has elapsed from the first time point t1. Such a configuration enables detecting any unintentional noise input during image change.

Modification

The configuration in the fourth embodiment detects noise input. The configuration in this modification detects the input of an unintentional black screen, as indicated by an item, "Processed-Image Input" in FIG. 18. The following details such a configuration of the control test apparatus 1 according to the modification.

The test planning unit 21 further extracts second test data for checking that a predetermined fourth image is input to the display apparatus 61 before or after the processed image is input to the display apparatus 61. The predetermined fourth image, although being a black image herein, may be an image in monochrome other than black, such as a white image.

Figure 18:
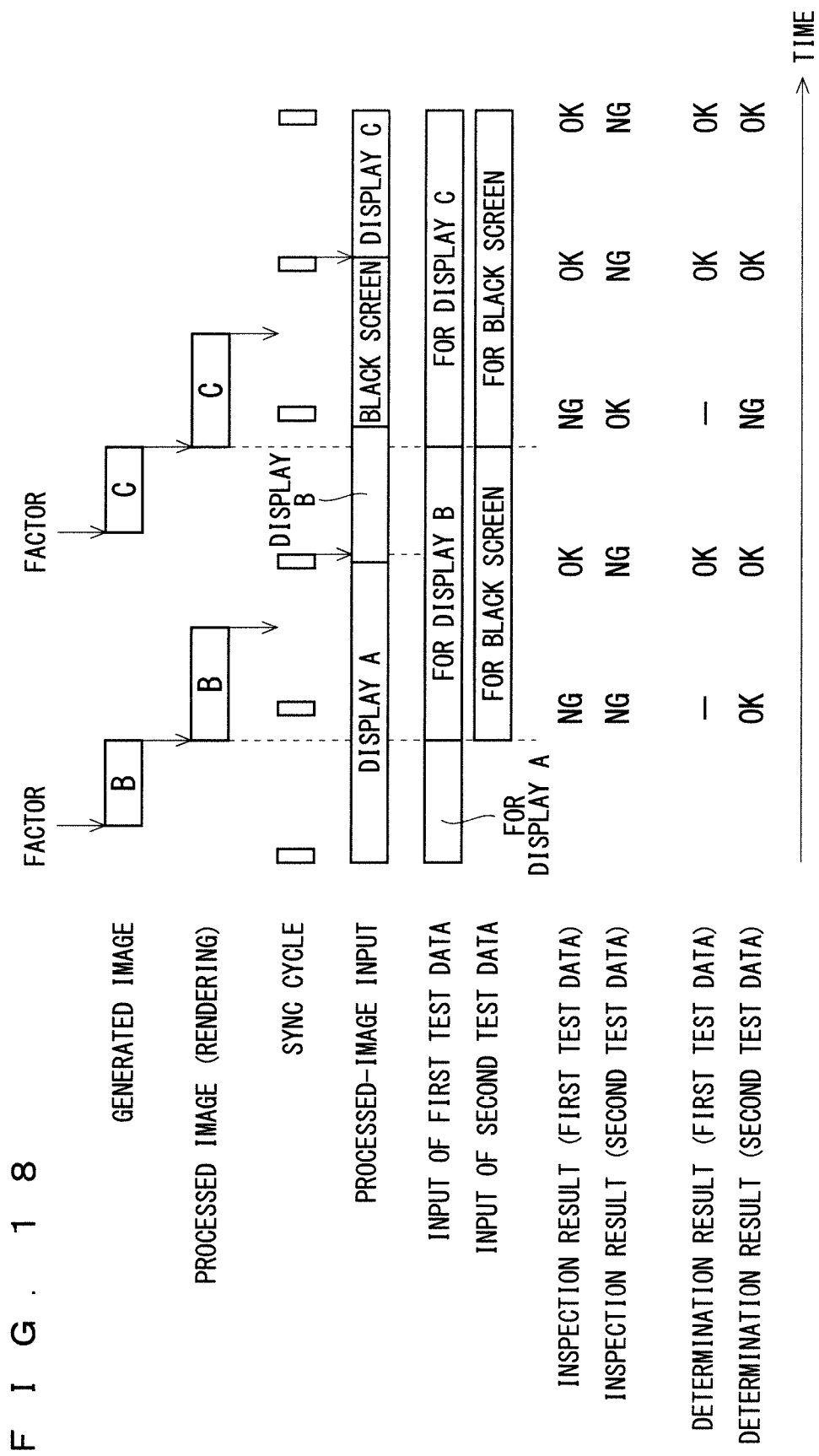
FIG. 18 is a timing chart showing the operation of a control test apparatus according to a modification.

The first and second test data as extracted in the test planning unit 21 is input to the image inspection unit 23 via the inspection controller 22. FIG. 18 shows the input of the first and second test data to the image inspection unit 23.

The image inspection unit 23 inspects, in parallel, whether the desired image is not input to the display apparatus 61 and whether the black image is input to the display apparatus 61, on the basis of the images as output from the display control apparatus 62, and of the first and second test data as acquired in the test planning unit 21. An item, "Inspection Result" in FIG. 18 shows one example of the result of an inspection using the first test data and one example of the result of an inspection using the second test data. The inspection using the second test data provides a result of OK during the input of the black image to the inspection controller 22, and provides a result of NG during the input of the other images to the inspection controller 22.

Reference is made to the inspection result using the first test data. The inspection-result determination unit 24, like the same in the second embodiment, stops the aforementioned determination until the predetermined time T elapses from the first time point t1, and performs the determination after the predetermined time T elapses from the first time point t1. Thus, a determination about the desired image provides a result of "-" immediately after the generated images are generated, as indicated by an item, "Determination Result (First Test Data)" in FIG. 18.

Reference is now made to the inspection result using the second test data. The inspection-result determination unit 24 performs a determination about the inspection result using the second test data similar to the aforementioned determination when an inspection result is obtained in the image inspection unit 23, about whether the black image is input to the display apparatus 61. However, the inspection-result determination unit 24 determines, on the basis of the result of the inspection using the second test data, whether the control in the display control apparatus 62 over the display apparatus 61 is abnormal, regardless of whether the predetermined time T has elapsed from the first time point t1. Thus, a determination result about the black image is provided even immediately after the generated images are generated, as indicated by an item, "Determination Result (Second Test Data)" in FIG. 18. In this example, the determination result based on the result of the inspection using the second test data is substantially identical to a result opposite the result the inspection using the second test data.

The control test apparatus 1 according to the modification provides a determination result of NG, as indicated by "Determination Result (Second Test Data)" in FIG. 18, in response to unintentional black-image input to the image inspection unit 23, and by extension, to the display apparatus 61, as indicated by "Processed-Image Input" in FIG. 18. This enables detecting any unintentional black-image input during image change. It is noted that for intentional black-image input during image change, the determination result based on the result of the inspection using the second test data may be substantially identical to the result of the inspection using the second test data.

Fifth Embodiment

The block configuration of a display control apparatus according to a fifth embodiment of the present invention is identical to that of the display control apparatus (FIG. 3) according to the second embodiment. Identical or similar components between the second and fifth embodiments are denoted by the same reference signs. Mainly described herein are different components between the second and fifth embodiments.

The display control apparatus 62 generates a plurality of generated images, and sequentially outputs a plurality of processed images corresponding to the plurality of generated images to both of the display apparatus 61 and the control test apparatus 1.

In the fifth embodiment, the image creation unit 63 generates a plurality of images on the basis of an external input. An item, "Generated Image" in FIG. 19 indicates that images B1, B2, B3, B4, and other images are generated as the plurality of generated images. The image creation unit 63 outputs the plurality of generated images to the image rendering unit 64, and at the same time, notifies changes in the plurality of generated images to the test planning unit 21 of the control test apparatus 1.

The plurality of generated images as generated in the image creation unit 63 are sequentially output, as the plurality of processed images, from the image output unit 66 through the image rendering unit 64 and the memory 65 to both of the display apparatus 61 and the control test apparatus 1. Accordingly, the plurality of processed images are sequentially input to the image inspection unit 23 of the control test apparatus 1. An item, "Processed-Image Input" in FIG. 19 indicates that processed images B1, B2, B3, B4, and other processed images are sequentially input to the image inspection unit 23 as the plurality of processed images.

Figure 19:
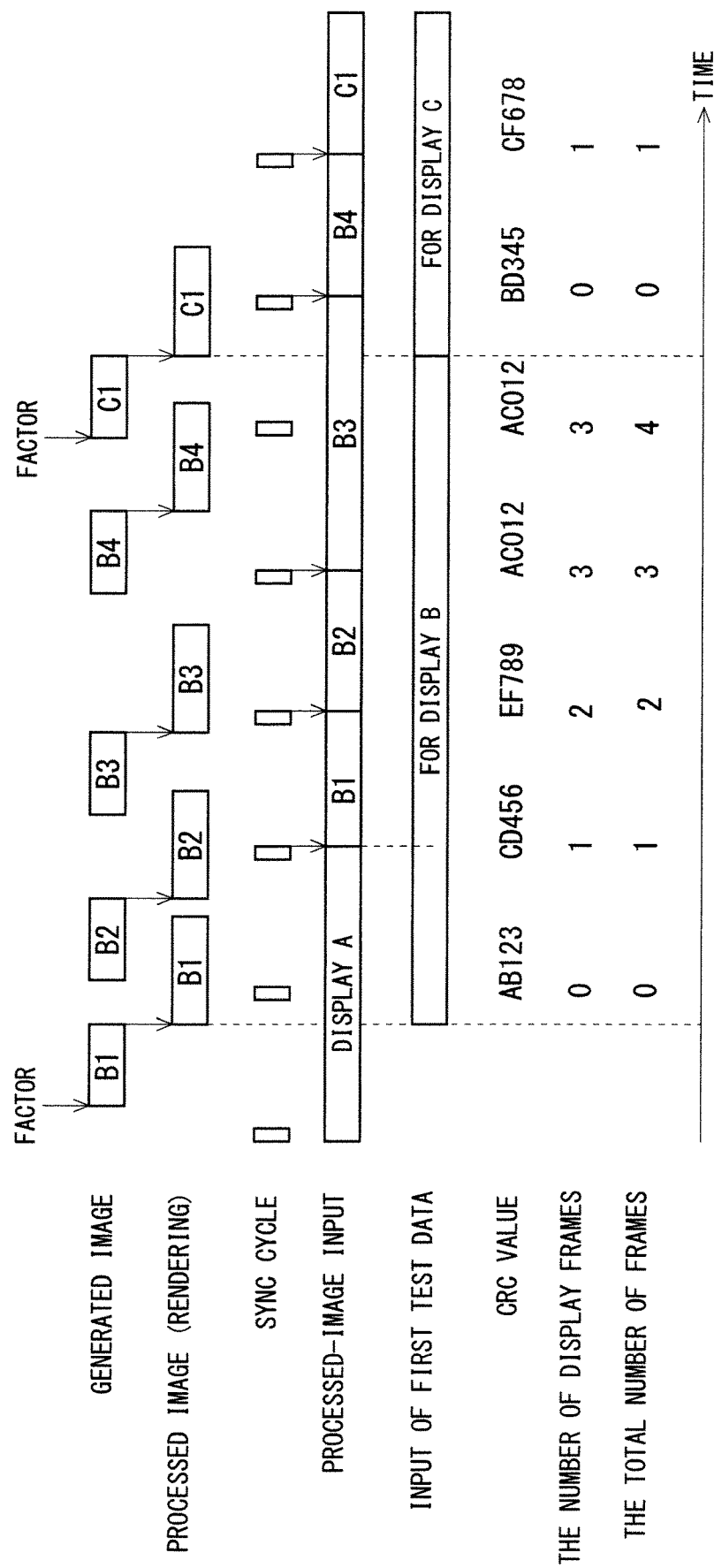
FIG. 19 is a timing chart showing the operation of a control test apparatus according to a fifth embodiment.

Upon receiving a notification of the changes in the plurality of generated images from the image creation unit 63, the test planning unit 21 extracts a piece of first test data about a plurality of desired images corresponding to the plurality of generated images. This piece of first test data as extracted in the test planning unit 21 is input to the image inspection unit 23 via the inspection controller 22. FIG. 19 shows that first test data for a display B is input to the image inspection unit 23 as a piece of first test data about generated images B1, B2, B3, and B4.

The image inspection unit 23 calculates a plurality of values for inspection about the plurality of processed images, on the basis of the plurality of processed images as sequentially output from the display control apparatus 62 to the control test apparatus 1. Each value for inspection, although being a CRC value herein, may be any value. An item, "CRC Value" in FIG. 19 shows one example of the CRC values as calculated in the image inspection unit 23. Values, "CD456", "EF789", "AC012", and "BD345" are respectively CRC values of the processed images B1, B2, B3, and B4.

The inspection-result determination unit 24 calculates, on the basis of the plurality of CRC values as calculated in the image inspection unit 23, a frame rate indicating the frequency of changes in the plurality of processed images. In the fifth embodiment, the inspection-result determination unit 24 increments, after notified of a change in the first test data, the total number of frames every time the image inspection unit 23 calculates the CRC values. The inspection-result determination unit 24 basically increments the number of display frames in addition to the total number of frames. However, the inspection-result determination unit 24 suspends the increment of the number of display frames when a currently calculated CRC value is identical to the last calculated CRC value.

Items, "Number of Display Frames" and "Total Number of Frames" in FIG. 19 show one example of the number of display frames as obtained in the inspection-result determination unit 24, and one example of the total number of frames as obtained in the inspection-result determination unit 24. In this example, the number of display frames about the plurality of processed images B1, B2, B3, and B4 is three; in addition, the total number of frames about the same is four.

The inspection-result determination unit 24 applies an expression, "frame rate=the number of display frames/(the total number of frames x the cycle of a v-sync)" to the number of display frames and total number of frames as obtained, to thus calculate the frame rate. Here, the cycle of the v-sync signal is a constant. For instance, let the cycle of the v-sync signal be 0.016; the number of display frames, three; and the total number of frames, four. Then, the aforementioned expression provides a frame rate of 47 fps (=3/(4×0.016)).

The inspection-result determination unit 24 may calculate the frame rate during a time period after receipt of a test change notification until receipt of the next test change notification, or during part of this time period. Alternatively, the inspection-result determination unit 24 may calculate the frame rate after a predetermined time T elapses from a first time point.

The inspection-result determination unit 24 determines whether control in the display control apparatus 62 over the display apparatus 61 is abnormal on the basis of the calculated frame rate and a predetermined threshold. When having calculated a frame rate greater than the predetermined threshold, for instance, the inspection-result determination unit 24 determines that an image is excessively changed by a noise and other things, thus determining that display control is abnormal.

<Operation>

Figure 20:
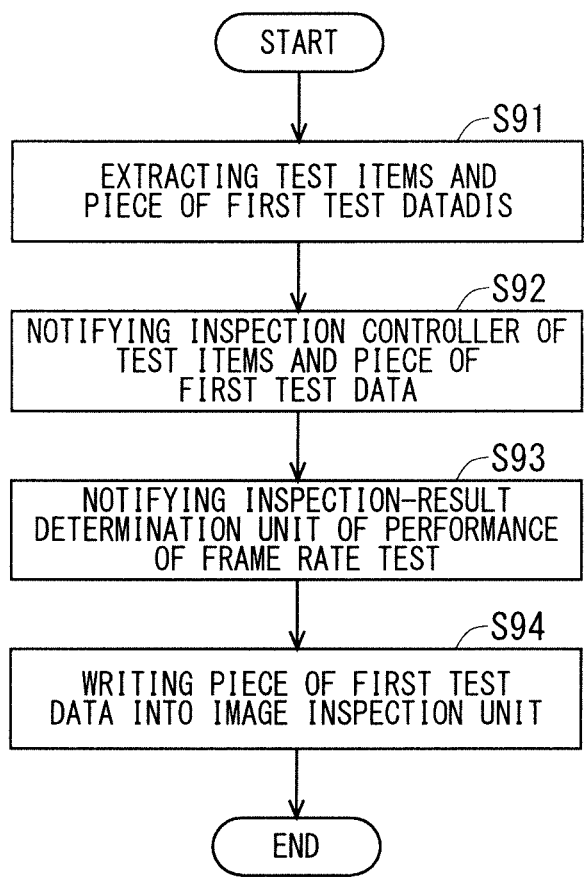
FIG. 20 is a flowchart showing processing in the control test apparatus according to the fifth embodiment.

FIG. 20 is a flowchart showing test planning according to the fifth embodiment.

In step S91, upon receiving a notification of changes in a plurality of images, the test planning unit 21 firstly extracts test items and a piece of first test data that are consistent with the plurality of images generated in the image creation unit 63. In step S92, the test planning unit 21 notifies the inspection controller 22 of the test items and piece of first test data as extracted.

In step S93, upon receiving, from the test planning unit 21, the piece of first test data consistent with the plurality of images, the inspection controller 22 notifies the inspection-result determination unit 24 of the performance of a frame rate test. In step S94, the inspection controller 22 writes, into the image inspection unit 23, the piece of first test data consistent with the plurality of images. At this stage, a given value for frame rate detection is written into the image inspection unit 23. The processing in FIG. 20 then ends.

Figure 21:
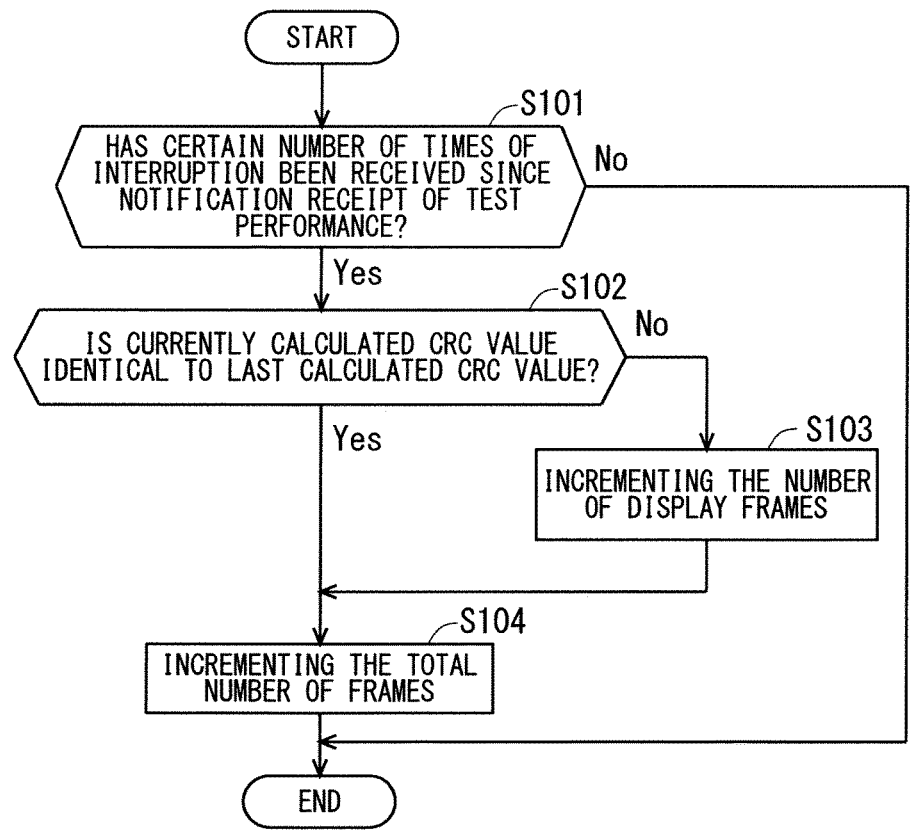
FIG. 21 is a flowchart showing processing in the control test apparatus according to the fifth embodiment.

FIG. 21 is a flowchart showing frame rate calculation according to the fifth embodiment.

In step S101, the inspection-result determination unit 24 firstly determines whether it has received a certain number of times of interruption since notification receipt of the performance of the frame rate test. If it has received a certain number of times of interruption, the processing proceeds to step S102. If it has not received a certain number of times of interruption, the processing in FIG. 21 ends.

In step S102, the inspection-result determination unit 24 determines whether a currently calculated CRC value is identical to the last calculated CRC value. If the currently calculated CRC value is identical to the last calculated CRC value, the processing proceeds to step S104; If the currently calculated CRC value is not identical to the last calculated CRC value, to step S103.

In step S103, the inspection-result determination unit 24 increments the number of display frames. The processing then proceeds to step S104. In step S104, the inspection-result determination unit 24 increments the total number of frames. The processing in FIG. 21 then ends.

Figure 22:
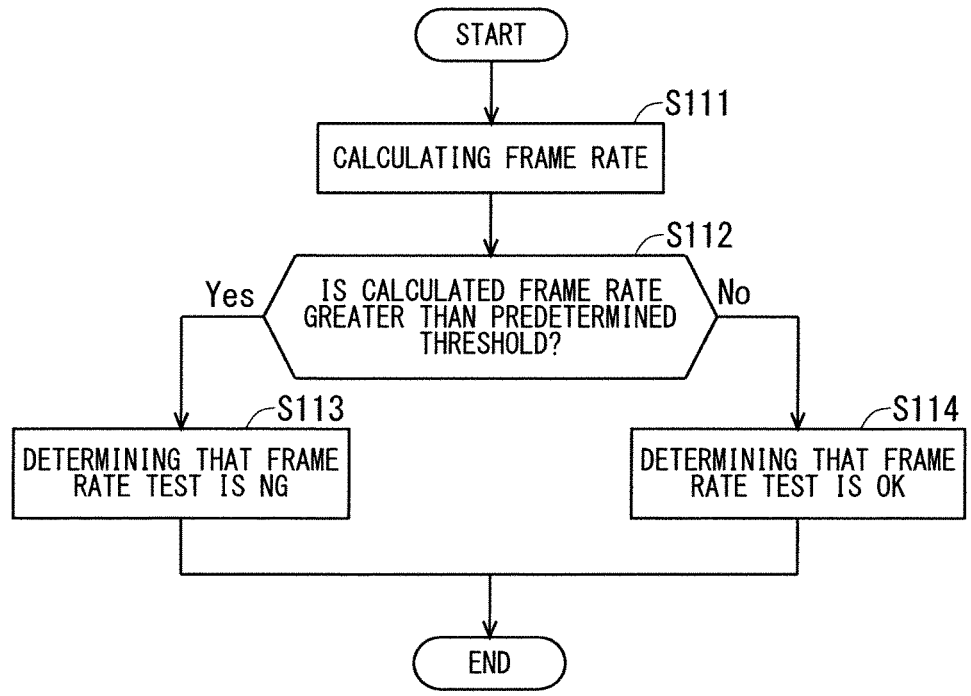
FIG. 22 is a flowchart showing processing in the control test apparatus according to the fifth embodiment.

FIG. 22 is a flowchart showing the processing of performing a frame rate test according to the fifth embodiment. This processing is performed when the inspection-result determination unit 24 receives a notification of the performance of the frame rate test.

In step S111, the inspection-result determination unit 24 calculates a frame rate on the basis of the number of display frames and the total number of frames. In step S112, the inspection-result determination unit 24 determines whether the calculated frame rate is greater than a predetermined threshold. If the calculated frame rate is greater than the predetermined threshold, the processing proceeds to step S113; If the calculated frame rate is equal to or less than the predetermined threshold, to step S114.

In step S113, the inspection-result determination unit 24 determines that display control is abnormal, that is, a frame rate test is NG, and then stores the result of the determination and the frame rate in the storage 68. The processing in FIG. 22 then ends. In step S114, the inspection-result determination unit 24 determines that the display control is normal, that is, the image-change-check test is OK, and then stores the result of the determination and the frame rate in the storage 68. The processing in FIG. 22 then ends.

Gist of Fifth Embodiment

The control test apparatus 1 according to the fifth embodiment calculates the frame rate, which indicates the frequency of the changes in the plurality of processed images, and determines whether the display control is abnormal on the basis of the frame rate and the predetermined threshold. Such a configuration enables detecting an excessive image change resulting from, for instance, a noise.

In the foregoing description, the control test apparatus 1 determines that the display control is abnormal in response to the calculated frame rate greater than the predetermined threshold. The control test apparatus 1 may determine that the display control is abnormal in response to, for instance, a frame rate as calculated that is smaller than the predetermined threshold. Such a configuration enables detecting that an image change as intended has not been obtained.

<Other Modifications>

Hereinafter, the acquisition unit 11 and the controller 12, which are in the control test apparatus 1, will be referred to as "the acquisition unit 11 and the other component". The acquisition unit 11 and the other component are implemented by a processing circuit 91 illustrated in FIG. 23. That is, the processing circuit 91 includes the following: the acquisition unit 11 configured to acquire, in accordance with a change in a first image, first test data for checking that a third image is input to the display apparatus 61; and the controller 12 configured to determine, whenever necessary, on the basis of a second image that is output from the display control apparatus 62 and the first test data as acquired in the acquisition unit 11, whether control in the display control apparatus 62 over the display apparatus 61 is abnormal, and to stop the determination until a predetermined time elapses from a first time point, the predetermined time being equal to or greater than a time from the first time point at which the first test data is input, to a second time point at which the second image is input. The processing circuit 91 may be dedicated hardware or a processor to execute a program stored in a memory. Examples of the processor include a central processing unit, a processing unit, a calculator, a microprocessor, a microcomputer, and a digital signal processor.

For dedicated hardware used as the processing circuit 91, examples of the processing circuit 91 include a single circuit, a complex circuit, a programmed processor, a parallel programmed processor, an application-specific integrated circuit (ASIC), a field-programmable gate array (FPGA), and a combination thereof. The functions of the acquisition unit 11 and the other component each may be implemented by a decentralized processing circuit. Alternatively, the functions of the image acquisition unit 11 and the other component may be, all together, implemented by a single processing circuit.

For a processor used as the processing circuit 91, the functions of the image acquisition unit 11 and the other component are implemented in combination with software and other things. Examples of the software and other things include software, firmware, and a combination of software and firmware. The software and other things are written as a program and stored in a memory. As illustrated in FIG. 24, a processor 92 serving as the processing circuit 91 reads a program stored in a memory 93 for execution, to thus implement the function of each component. That is, the control test apparatus 1 includes the memory 93 to store a program, which, when executed by the processing circuit 91, performs the following steps: acquiring, in accordance with a change in a first image, first test data for checking that a third image is input to the display apparatus 61, and then outputting the first test data to the controller 12; and determining, whenever necessary, on the basis of the second image as input to the controller 12 and the first test data as input to the controller 12, whether control in the display control apparatus 62 over the display apparatus 61 is abnormal. The determination step includes stopping the determination until a predetermined time elapses from a first time point, the predetermined time being equal to or greater than a time from the first time point at which the first test data is input to a second time point at which the second image is input. In other words, this program is for a computer to execute the procedure or method of the acquisition unit 11 and of the other component. Here, examples of the memory 93 include a non-volatile or volatile semiconductor memory, such as a random access memory (RAM), a read only memory (ROM), a flash memory, an erasable programmable read only memory (EPROM), or an electrically erasable programmable read only memory (EEPROM), and include a hard disk drive (HDD), a magnetic disc, a flexible disc, an optical disc, a compact disc, a mini disc, a digital versatile disc (DVD), and a driver thereof.

The foregoing has described that each function of the acquisition unit 11 and the other component is implemented by one of hardware, software, and other things. Some part of the acquisition unit 11 and of the other component may be implemented by dedicated hardware; and the other part, by software and other things.

The control test apparatus 1 in the foregoing description can be used also as a control test system that is established as a system in combination, as necessary, with a navigation device, such as a portable navigation device (PND), with a communication terminal including a mobile terminal, such as a mobile phone, a smart phone, or a tablet, with the functions of applications installed therein, and with a server. In this case, the individual functions or individual components of the control test apparatus 1 described above may be decentralized in the individual devices constituting this system, or may be centralized in any of these devices.

It is noted that in the present invention, the individual embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1 control test apparatus, 11 acquisition unit, 12 controller, 22 inspection controller, 23 image inspection unit, 24 inspection-result determination unit, 61 display apparatus, 62 display control apparatus.

The invention claimed is:

1. A control test apparatus that tests for abnormality of control in a display control apparatus over a display apparatus, the display control apparatus controlling display in the display apparatus by acquiring a first image and outputting, to the display apparatus, a second image being the first image that has undergone pre-processing for display in the display apparatus, the display control apparatus further outputting the second image to the control test apparatus, the control test apparatus comprising:
   a processor to execute a program; and
   a memory to store the program which, when executed by the processor, performs,
      an acquisition process acquiring, in accordance with a change in the first image, first test data for checking that a third image is input to the display apparatus, the third image being acquired from the first image having normally undergone the pre-processing, and
      a control process determining, at a predefined time relative to the acquisition of the first test data, on the basis of the second image as input to a controller of the display control apparatus and the first test data as input to the controller, whether the control in the display control apparatus over the display apparatus is abnormal, and stopping the determination until a predetermined time elapses from a first time point, the predetermined time being equal to or greater than a time from the first time point at which the first test data is input to the controller to a second time point at which the second image is input to the controller.

2. The control test apparatus according to claim 1, wherein the control process comprises
   an image inspection process inspecting, at the predefined time relative to the acquisition of the first test data, on the basis of the second image as input to an image inspection unit included in the controller and of the first test data as input to the image inspection unit, whether the third image is not input to the display apparatus,
   an inspection control process stopping the image inspection process from performing the inspection until the predetermined time elapses from the first time point, and allowing the image inspection process to perform the inspection after the predetermined time elapses from the first time point, and
   an inspection-result determination process determining that the control in the display control apparatus over the display apparatus is abnormal when an inspection result that the third image is not input to the display apparatus is obtained in the image inspection process.

3. The control test apparatus according to claim 1, wherein the control process comprises
   an image inspection process inspecting, at the predefined time relative to the acquisition of the first test data, on the basis of the second image as input to an image inspection unit included in the controller and of the first test data as input to the image inspection unit, whether the third image is not input to the display apparatus, and
   an inspection-result determination process determining that the control in the display control apparatus over the display apparatus is abnormal when an inspection result that the third image is not input to the display apparatus is obtained in the image inspection process, stopping the determination until the predetermined time elapses from the first time point, and performing the determination after the predetermined time elapses from the first time point.

4. The control test apparatus according to claim 3, wherein the inspection-result determination process determines that the control in the display control apparatus over the display apparatus is abnormal in at least one of a case where an inspection result that the third image is not input to the display apparatus is successively obtained over a predetermined number of times from the first time point, and a case where an inspection result that the third image is not input to the display apparatus is obtained in relation to a piece of the first test data after an inspection result that the third image is not input to the display apparatus is not obtained in relation to the piece of the first test data.

5. The control test apparatus according to claim 3, wherein the display control apparatus is configured to acquire two of the first images, and to sequentially output two of the second images corresponding to the two of the first images to both of the display apparatus and the control test apparatus,
wherein the acquisition process acquires two pieces of the first test data about two of the third images corresponding to the two of the first images,
wherein the image inspection process performs two of the inspections in parallel using the two pieces of the first test data, and wherein when two of the inspection results are obtained in parallel in the image inspection process using the two pieces of the first test data, the inspection-result determination process determines whether the control in the display control apparatus over the display apparatus is abnormal on the basis of the two of the inspection results, regardless of whether the predetermined time has elapsed from the first time point.

6. The control test apparatus according to claim 3,
wherein the acquisition process further acquires second test data for checking that a fourth image that is predetermined is input to the display apparatus before or after the second image is input to the display apparatus,
wherein the image inspection process inspects, in parallel, whether the third image is not input to the display apparatus and whether the fourth image is input to the display apparatus, on the basis of an image that is output from the display control apparatus to the control test apparatus and of the first and second test data as acquired in the acquisition process, and
wherein when an inspection result is obtained in the image inspection process, about whether the fourth image is input to the display apparatus, the inspection-result determination process determines, on the basis of the inspection result about whether the fourth image is input to the display apparatus, whether the control in the display control apparatus over the display apparatus is abnormal, regardless of whether the predetermined time has elapsed from the first time point.

7. The control test apparatus according to claim 3,
wherein the display control apparatus is configured to acquire a plurality of the first images, and to sequentially output a plurality of the second images corresponding to the plurality of the first images to both of the display apparatus and the control test apparatus,
wherein the acquisition process acquires a piece of the first test data about a plurality of the third images corresponding to the plurality of the first images,
wherein the image inspection process calculates a plurality of values for inspection about the plurality of the second images, on the basis of the plurality of the second images as sequentially output from the display control apparatus to the control test apparatus, and
wherein the inspection-result determination process calculates, on the basis of the plurality of values for inspection as calculated in the image inspection process, a frame rate indicating frequency of changes in the plurality of the second images, and determines, on the basis of the frame rate and a predetermined threshold, whether the control in the display control apparatus over the display apparatus is abnormal.

8. A control test method in a control test apparatus that tests for abnormality of control in a display control apparatus over a display apparatus, the display control apparatus controlling display in the display apparatus by acquiring a first image and outputting, to the display apparatus, a second image being the first image that has undergone pre-processing for display in the display apparatus, the display control apparatus further outputting the second image to a controller of the control test apparatus, the control test apparatus acquiring, in accordance with a change in the first image, first test data for checking that a third image is input to the display apparatus, the third image being acquired from the first image having normally undergone the pre-processing, and then outputting the first test data to the controller, the control test method comprising:
  determining, at a predefined time relative to the acquisition of the first test data, on the basis of the second image as input to the controller and the first test data as input to the controller, whether the control in the display control apparatus over the display apparatus is abnormal; and
  stopping the determination until a predetermined time elapses from a first time point, the predetermined time being equal to or greater than a time from the first time point at which the first test data is input to the controller to a second time point at which the second image is input to the controller.

* * * * *